(12) United States Patent
Liu et al.

(10) Patent No.: US 11,777,682 B2
(45) Date of Patent: *Oct. 3, 2023

(54) TECHNIQUES AND APPARATUSES FOR WAKEUP SIGNAL DESIGN AND RESOURCE ALLOCATION

(71) Applicant: QUALCOMM Incorporated, San Diego, CA (US)

(72) Inventors: Le Liu, Fremont, CA (US); Alberto Rico Alvarino, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/308,959

(22) Filed: May 5, 2021

(65) Prior Publication Data
US 2021/0258120 A1    Aug. 19, 2021

Related U.S. Application Data

(63) Continuation of application No. 16/031,671, filed on Jul. 10, 2018, now Pat. No. 11,032,047.
(Continued)

(51) Int. Cl.
*H04L 5/00* (2006.01)
*H04W 52/02* (2009.01)
(Continued)

(52) U.S. Cl.
CPC .......... *H04L 5/0051* (2013.01); *H04L 5/0053* (2013.01); *H04W 4/06* (2013.01);
(Continued)

(58) Field of Classification Search
None
See application file for complete search history.

(56) References Cited

U.S. PATENT DOCUMENTS 9,235,251 B2    1/2016    Salsbery et al.
9,357,416 B2    5/2016    Banister et al.
(Continued)

FOREIGN PATENT DOCUMENTS

CN    104838685 A    8/2015
GB    2562111 A    11/2018
(Continued)

OTHER PUBLICATIONS

International Search Report and Written Opinion—PCT/US2018/051510—ISA/EPO—dated Jan. 21, 2019.
(Continued)

*Primary Examiner* — Srinivasa R Reddivalam
(74) *Attorney, Agent, or Firm* — Nerrie M. Zohn

(57) ABSTRACT

A method, an apparatus, a base station, a user equipment, and a computer program product for wireless communication are provided. The base station may configure resource allocation for wakeup signaling based at least in part on one or more resource patterns corresponding to different user equipment groups and/or antenna port configurations. The user equipment may receive a wakeup signal based at least in part on the resource allocation, detect the wakeup signal based at least in part on a preamble of the wakeup signal, and receive a subsequent communication based at least in part on the wakeup signal. Numerous other aspects are provided.

34 Claims, 16 Drawing Sheets

Related U.S. Application Data

(60) Provisional application No. 62/565,767, filed on Sep. 29, 2017.

(51) Int. Cl.
*H04W 76/28* (2018.01)
*H04W 4/06* (2009.01)
*H04W 8/24* (2009.01)
*H04W 56/00* (2009.01)
*H04W 76/27* (2018.01)

(52) U.S. Cl.
CPC ......... *H04W 8/24* (2013.01); *H04W 52/0212* (2013.01); *H04W 52/0216* (2013.01); *H04W 52/0229* (2013.01); *H04W 56/001* (2013.01); *H04W 76/28* (2018.02); *H04W 76/27* (2018.02)

(56) References Cited

U.S. PATENT DOCUMENTS

| | | | |
|---|---|---|---|
| 11,153,849 B2 | 10/2021 | Lee et al. | |
| 2012/0106374 A1* | 5/2012 | Gaal | H04L 5/0048 370/252 |
| 2012/0163422 A1 | 6/2012 | Lee et al. | |
| 2014/0266921 A1 | 9/2014 | Joshi et al. | |
| 2016/0323824 A1* | 11/2016 | Xhafa | H04W 56/001 |
| 2017/0013553 A1* | 1/2017 | Huang | H04W 52/0209 |
| 2018/0255515 A1* | 9/2018 | Gupta Hyde | H04W 52/0235 |
| 2019/0045481 A1* | 2/2019 | Sang | H04W 76/14 |
| 2019/0103950 A1 | 4/2019 | Liu et al. | |
| 2020/0245317 A1* | 7/2020 | Hwang | H04W 68/02 |

FOREIGN PATENT DOCUMENTS

| | | |
|---|---|---|
| TW | 201613300 A | 4/2016 |
| TW | 201728207 A | 8/2017 |
| WO | 2011085330 A1 | 7/2011 |
| WO | 2013115914 A1 | 8/2013 |
| WO | WO-2017052596 A1 | 3/2017 |

OTHER PUBLICATIONS

International Preliminary Report on Patentability—PCT/US2018/051510, The International Bureau of WIPO—Geneva, Switzerland, dated Apr. 9, 2020.
Partial International Search Report—PCT/US2018/051510—ISA/EPO—dated Nov. 23, 2018.
Qualcomm: "UE Power Evaluation for DRX with Wake-Up Signaling", 3GPP TSG-RAN WG1 NR AdHoc, R1-1700820, dated Jan. 2017, 7 pages (Year: 2017).
Taiwan Search Report—TW107132927—TIPO—dated Oct. 11, 2021.
Qualcomm Incorporated: "Detailed Design for WUS Signal Design", 3GPP TSG RAN WG1 #92bis, R1-1804920, 3rd Generation Partnership Project, Mobile Competence Centre, 650, Route Des Lucioles, F-06921 Sophia-Antipolis Cedex, France, vol. RAN WG1, No. Sanya, China, Apr. 16-Apr. 20, 2018, Apr. 15, 2018, pp. 1-17, XP051427183, Section 3.1, par. 2, Section 3.2, par. 1, Section 4, par. 1, first point "Problem 1", first two sub-points.
Qualcomm Incorporated: "Efficient Monitoring of DL Control Channels," 3GPP TSG RAN #90, R1-1712806 Efficient Monitoring of DL Control Channels, 3rd Generation Partnership Project, Mobile Competence Centre, 650, Route Des Lucioles, F-06921 Sophia-Antipolis Cedex, FRA, vol. RAN WG1, No. Prague, Czechia, Aug. 21-Aug. 25, 2017, Aug. 20, 2017, XP051315618, pp. 1-11.
Sony: "NB-IoT UE Power Consumption Reduction in Idle Mode Paging", 3GPP TSG RAN WG1 #88b, R1-1705203, Internet: URL: http://www.3gpp.org/ftp/tsg_ran/WG1_RL1/TSGR1_88b/Docs/R1-1705203.zip. Mar. 25, 2017, 4 Pages.
Sony: "WUS Aspects on Grouping and Mobility for efeMTC and feNB-IoT", 3GPP TSG RAN WG2 Meeting #100, R2-1712993, Reno, USA, Nov. 27-Dec. 1, 2017, pp. 1-6, Nov. 16, 2017.
Vivo: "Remaining Aspects on Configurations and Procedures of Wake-Up Signals for feNB-IoT[online]", 3GPP TSG RAN WG1 #93, R1-1806032, Susan, Korea, May 21-25, 2018, pp. 1-6, May 12, 2018.

* cited by examiner

| SF 0 | SF 1 | SF 2 | SF 3 | SF 4 | SF 5 | SF 6 | SF 7 | SF 8 | SF 9 |
|------|------|------|------|------|------|------|------|------|------|
| NPBCH | WUS1 | WUS2 | WUS1 | SIB1 | NPSS | WUS2 | WUS1 | WUS2 | NSSS |

TDM/antenna port/antenna/precoder set transmission pattern 505-1

FIG. 5A

| SF 0 | SF 1 | SF 2 | SF 3 | SF 4 | SF 5 | SF 6 | SF 7 | SF 8 | SF 9 |
|---|---|---|---|---|---|---|---|---|---|
| NPBCH | WUS1 | WUS1 | WUS1 | SIB1 | NPSS | WUS2 | WUS2 | WUS2 | NSSS |

TDM/antenna port/antenna/precoder set transmission pattern 505-2

TDM/antenna port/antenna/
precoder set transmission
pattern 505-3

510 — | SF 0 | SF 1 | SF 2 | SF 3 | SF 4 | SF 5 | SF 6 | SF 7 | SF 8 | SF 9 |
| NPBCH | WUS1 | WUS1 | WUS1 | SIB1 | NPSS | WUS1 | WUS1 | WUS1 | NSSS |

515 — | SF 0 | SF 1 | SF 2 | SF 3 | SF 4 | SF 5 | SF 6 | SF 7 | SF 8 | SF 9 |
| NPBCH | WUS2 | WUS2 | WUS2 | SIB1 | NPSS | WUS2 | WUS2 | WUS2 | NSSS |

TECHNIQUES AND APPARATUSES FOR WAKEUP SIGNAL DESIGN AND RESOURCE ALLOCATION

CLAIM OF PRIORITY UNDER 35 U.S.C. § 119

This application is a continuation of U.S. patent application Ser. No. 16/031,671 titled "TECHNIQUES AND APPARATUSES FOR WAKEUP SIGNAL DESIGN AND RESOURCE ALLOCATION," filed Jul. 10, 2018, which claims priority to U.S. Provisional Patent Application No. 62/565,767, filed on Sep. 29, 2017, entitled "TECHNIQUES AND APPARATUSES FOR WAKEUP SIGNAL DESIGN AND RESOURCE ALLOCATION," which is hereby expressly incorporated by reference herein.

BACKGROUND

Field

Aspects of the present disclosure generally relate to wireless communication, and more particularly to techniques and apparatuses for wakeup signal design and resource allocation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS may transmit a signal to a UE to indicate whether the UE should decode a subsequent communication (e.g., a downlink channel). The signal, which may be a sequence carrying limited indication information, is associated with an occasion where a subsequent communication, carrying more information, may occur. This may improve battery efficiency of the UE because the UE may not scan for the subsequent communication unless the UE receives the signal. For example, such a signal may be termed a wakeup signal.

SUMMARY

In some cases, a wakeup signal may apply to multiple UEs. By assigning UEs to two or more UE groups, all UEs of a UE group can be awakened using a single wakeup signal. This may be more efficient than transmitting a wakeup signal to a single UE, and may be more efficient than waking up all UEs (instead of only a group of UEs) for the subsequent communication. It may be beneficial to achieve diversity (e.g., frequency diversity, time diversity, and/or spatial diversity) for wakeup signals that are destined to different UE groups.

Some techniques and apparatuses, described herein, provide for resource allocation to achieve frequency diversity, time diversity, and/or spatial diversity for wakeup signals destined to two or more UE groups by transmitting the wakeup signals according to respective resource patterns associated with the two or more UE groups. Additionally, some techniques and apparatuses described herein provide for resource allocation to achieve spatial diversity for wakeup signals for a single UE group by transmitting the wakeup signals using two or more antenna ports, two or more antennas of a single port, or two or more precoding sets of a precoding cycle, according to respective resource patterns associated with the two or more antenna ports, antennas, or precoding sets. The techniques and apparatuses described herein may be applied for anchor carriers (e.g., carriers that include a broadcast channel, system information block, and/or synchronization signal) or for non-anchor carriers.

Furthermore, some techniques and apparatuses described herein provide for transmission of wakeup signals associated with a configured delay between the transmission of wakeup signal and the other signals (e.g., a physical downlink control channel, a physical downlink shared channel, etc.) scheduled for the UE that may be based at least in part on capabilities of the UE. Still further, some techniques and apparatuses described herein provide for resource allocation for a wakeup signal pertaining to a repetitious communication so that UEs which cannot decode the repetitions communication are not awakened. In this way, resource allocation of wakeup signals is improved, efficiency of UEs and UE groups is improved with regard to wakeup signaling, and diversity of wakeup signaling is improved.

Notably, while the techniques and apparatuses described herein may be described with regard to two UE groups, the techniques and apparatuses described herein are not limited to resource allocation for two UE groups. For example, some techniques and apparatuses described herein may be applied for 3 UE groups, 4 UE groups, 5 UE groups, or any number of UE groups.

In an aspect of the disclosure, a method performed by a base station, a method performed by a user equipment, an apparatus, a base station, a user equipment, and a computer program product are provided.

In some aspects, the method performed by the base station may include transmitting a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a user equipment (UE) associated with a first UE group or a second UE group; and/or transmitting a communication to the UE based at least in part on the wakeup signal.

In some aspects, the base station may include a memory and at least one processor coupled to the memory. The at least one processor may be configured to transmit a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and/or transmit a communication to the UE based at least in part on the wakeup signal.

In some aspects, the apparatus may include means for transmitting a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and/or means for transmitting a communication to the UE based at least in part on the wakeup signal.

In some aspects, the computer program product may include a non-transitory computer-readable medium storing computer executable code. The code may include code for transmitting a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and/or code for transmitting a communication to the UE based at least in part on the wakeup signal.

In some aspects, the method performed by the user equipment may include scanning a particular resource of a resource pattern to identify a wakeup signal that is associated with a UE group that includes the user equipment, wherein the resource pattern is associated with the UE group; and/or identifying the wakeup signal based at least in part on at least one of a cell identifier or UE group identifier associated with the user equipment, wherein at least a portion of the cell identifier or a portion of the UE group identifier is identified by the wakeup signal.

In some aspects, the user equipment may include a memory and at least one processor coupled to the memory. The at least one processor may be configured to scan a particular resource of a resource pattern to identify a wakeup signal that is associated with a UE group that includes the user equipment, wherein the resource pattern is associated with the UE group; and/or identify the wakeup signal based at least in part on at least one of a cell identifier or UE group identifier associated with the user equipment, wherein at least a portion of the cell identifier or a portion of the UE group identifier is identified by the wakeup signal.

In some aspects, the apparatus may include means for scanning a particular resource of a resource pattern to identify a wakeup signal that is associated with a UE group that includes the apparatus, wherein the resource pattern is associated with the UE group; and/or means for identifying the wakeup signal based at least in part on at least one of a cell identifier or UE group identifier associated with the apparatus, wherein at least a portion of the cell identifier or a portion of the UE group identifier is identified by the wakeup signal.

In some aspects, the computer program product may include a non-transitory computer-readable medium storing computer executable code. The code may include code for scanning a particular resource of a resource pattern to identify a wakeup signal that is associated with a UE group that includes a UE, wherein the resource pattern is associated with the UE group; and/or code for identifying the wakeup signal based at least in part on at least one of a cell identifier or UE group identifier associated with the UE, wherein at least a portion of the cell identifier or a portion of the UE group identifier is identified by the wakeup signal.

In some aspects, the method performed by the base station may include transmitting a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port; and transmitting a communication to a user equipment (UE) based at least in part on the wakeup signal.

In some aspects, the base station may include a memory and at least one processor coupled to the memory. The at least one processor may be configured to transmit a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port; and transmit a communication to a user equipment (UE) based at least in part on the wakeup signal.

In some aspects, the apparatus may include means for transmitting a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port; and means for transmitting a communication to a user equipment (UE) based at least in part on the wakeup signal.

In some aspects, the computer program product may include a non-transitory computer-readable medium storing computer executable code. The code may include code for transmitting a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port; and code for transmitting a communication to a user equipment (UE) based at least in part on the wakeup signal.

In some aspects, the method performed by the user equipment (UE) may include scanning a particular resource of a resource pattern to identify a wakeup signal associated with the UE; receiving the wakeup signal from a base station on the particular resource of the resource pattern, wherein the resource pattern corresponds to an antenna port via which the wakeup signal was transmitted; and identifying the wakeup signal as associated with the UE based at least in part on a cell identifier associated with the UE, wherein at least a portion of the cell identifier is indicated by the wakeup signal.

In some aspects, the user equipment (UE) may include a memory and at least one processor coupled to the memory. The at least one processor may be configured to scan a particular resource of a resource pattern to identify a wakeup signal associated with the UE; receive the wakeup signal from a base station on the particular resource of the resource pattern, wherein the resource pattern corresponds to an antenna port via which the wakeup signal was transmitted; and identify the wakeup signal as associated with the UE based at least in part on a cell identifier associated with the UE, wherein at least a portion of the cell identifier is indicated by the wakeup signal.

In some aspects, the apparatus may include means for scanning a particular resource of a resource pattern to identify a wakeup signal associated with the apparatus; means for receiving the wakeup signal from a base station on the particular resource of the resource pattern, wherein the resource pattern corresponds to an antenna port via which the wakeup signal was transmitted; and means for identifying the wakeup signal as associated with the apparatus based at least in part on a cell identifier associated with the apparatus, wherein at least a portion of the cell identifier is indicated by the wakeup signal.

In some aspects, the computer program product may include a non-transitory computer-readable medium storing computer executable code. The code may include code for scanning a particular resource of a resource pattern to identify a wakeup signal associated with a UE; code for receiving the wakeup signal from a base station on the particular resource of the resource pattern, wherein the resource pattern corresponds to an antenna port via which the wakeup signal was transmitted; and code for identifying the wakeup signal as associated with the UE based at least in part on a cell identifier associated with the UE, wherein at least a portion of the cell identifier is indicated by the wakeup signal.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 5A-5C are diagrams illustrating examples of time division multiplexed (TDM) and/or antenna port patterns for wakeup signal transmission.

DETAILED DESCRIPTION

Figure 1:
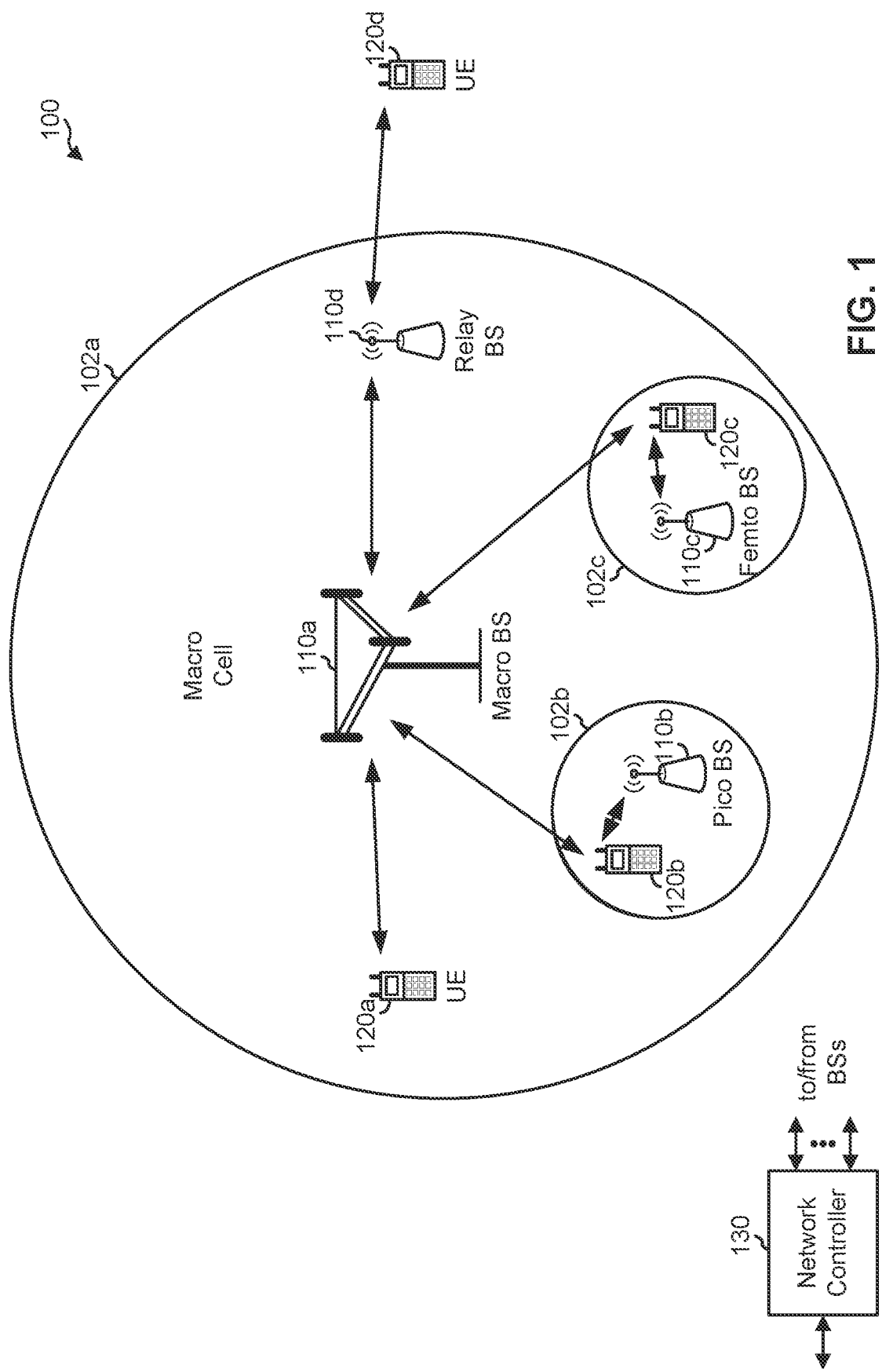
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). A UE 120 such as an NB-IoT or eMTC UE 120 may remain in a dormant or idle state until a wakeup signal is received. The wakeup signal may indicate that a communication is scheduled for the UE 120. In some aspects, described elsewhere herein, UEs 120 may be grouped into UE groups, which may increase the efficiency of use of the wakeup signal.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
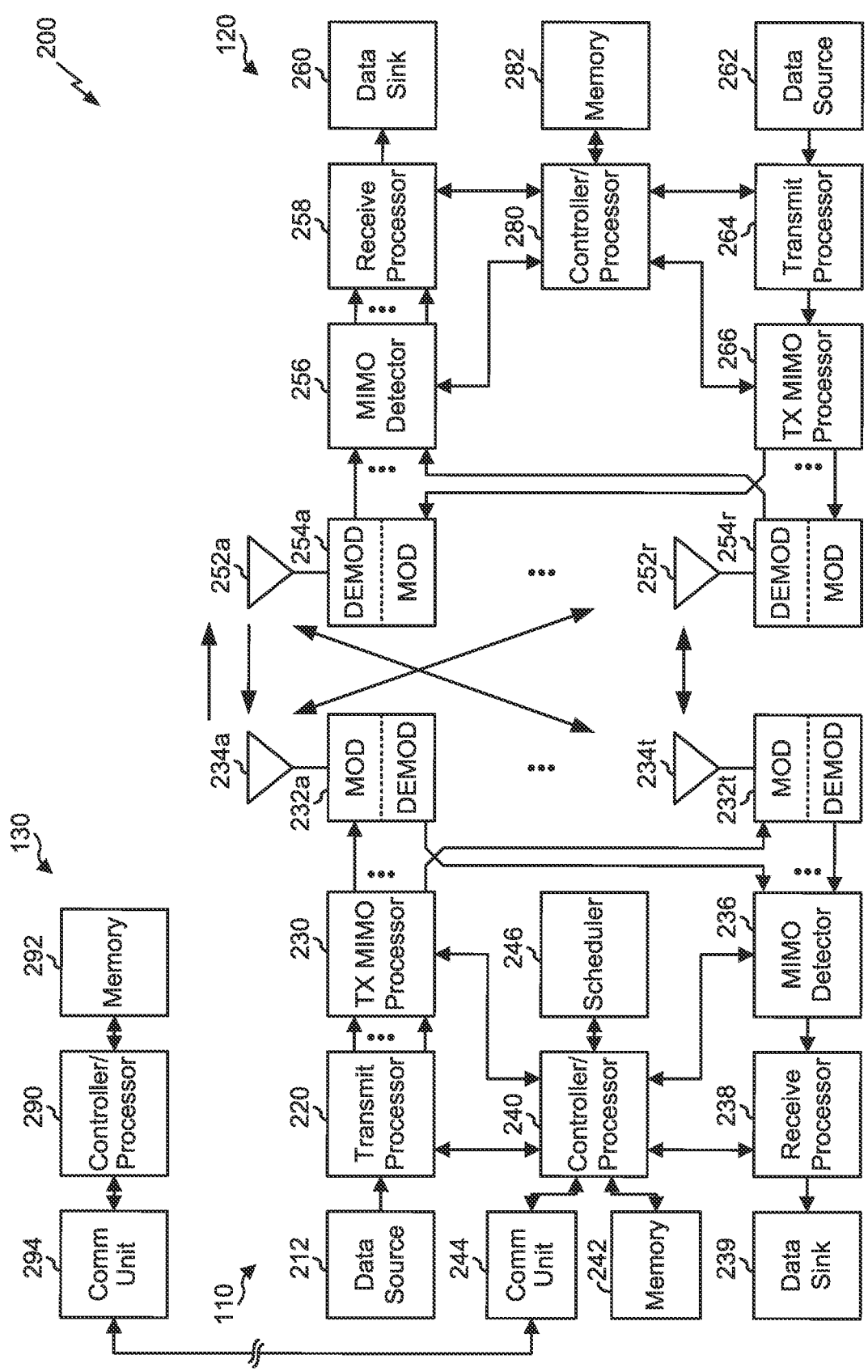
FIG. 2 is a diagram illustrating an example of a base station in communication with a UE in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), the narrowband reference signal (NRS)) and synchronization signals (e.g., the primary synchronization signal (PSS) and secondary synchronization signal (SSS), the narrowband PSS (NPSS) and narrowband SSS (NSSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, the channel processor may determine a reference value based at least in part on a wakeup signal, as described elsewhere herein.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform signaling related to wakeup signal resource allocation. For example, controller/processor 240 of BS 110, controller/processor 280 of UE 120, and/or any other component(s) of FIG. 2 may perform or direct operations of, for example, method 700 of FIG. 7, method 800 of FIG. 8, method 900 of FIG. 9, method 1000 of FIG. 10, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
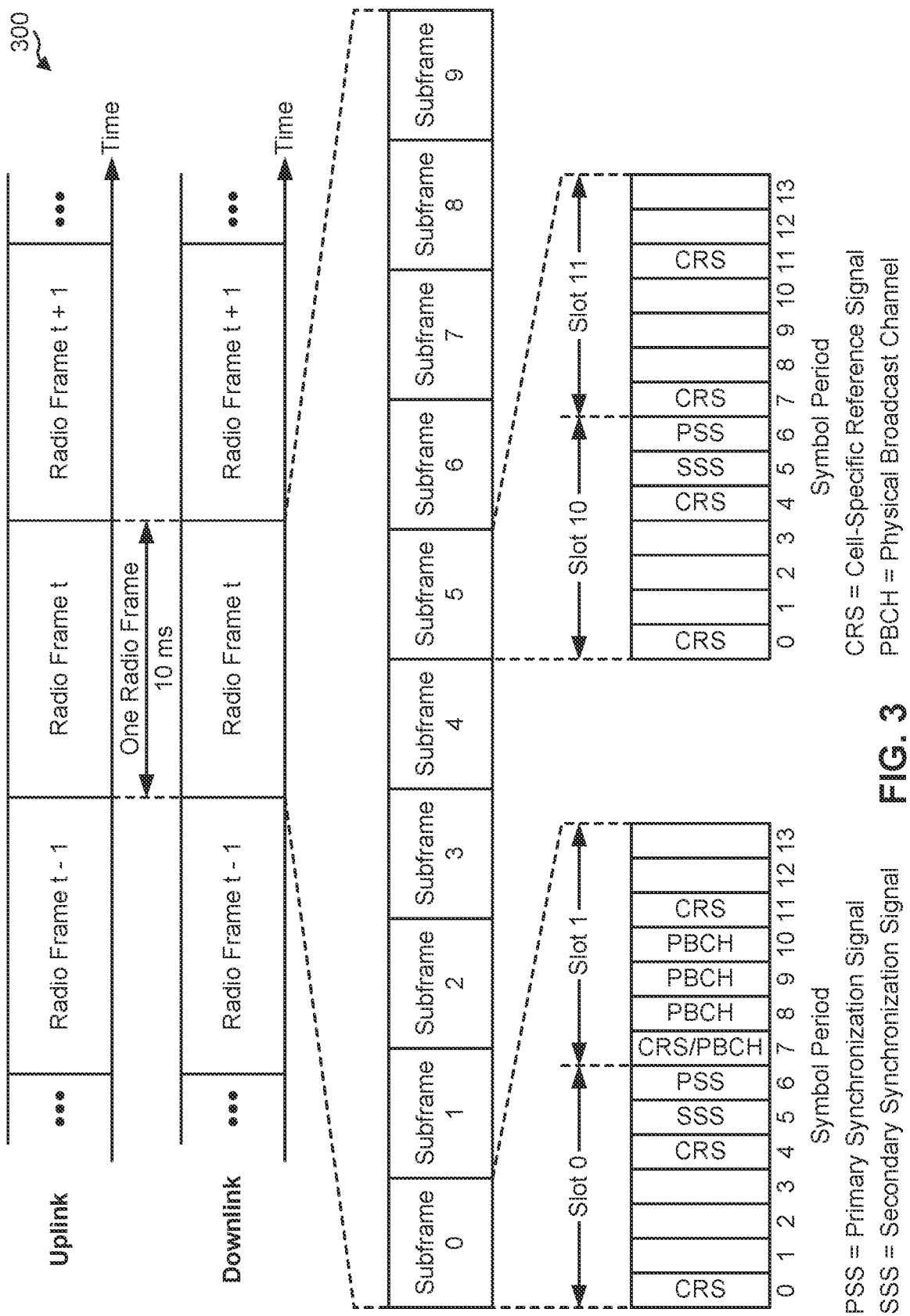
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. This cyclic prefix may be included in a preamble that may identify whether a communication is associated with a particular UE (e.g., based at least in part on a UE group identifier and/or a cell identifier associated with the particular UE). The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
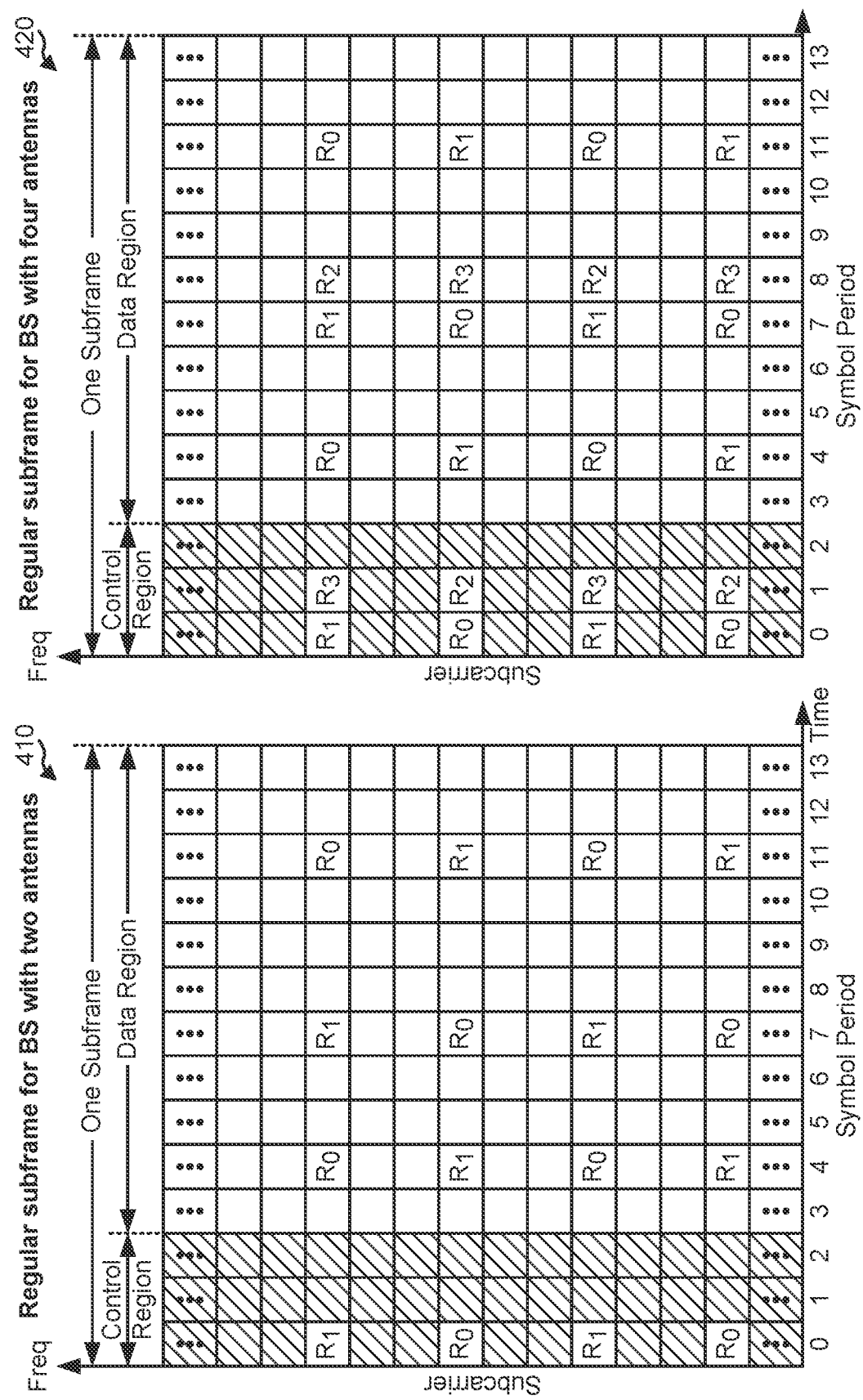
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

While aspects of the examples described herein may be associated with LTE technologies, aspects of the present disclosure may be applicable with other wireless communication systems, such as 5G technologies. 5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize orthogonal frequency division multiplexing (OFDM) with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

As indicated above, FIG. 4 is provided merely as an example. Other examples are possible and may differ from what was described with regard to FIG. 4.

FIGS. 5A-5C are diagrams illustrating examples 500 of TDM and/or antenna port patterns for wakeup signal transmission. A wakeup signal may be a sequence that carries limited indication information, and may be associated with an occasion where a subsequent communication, carrying more information, may occur. In some aspects, a wakeup signal may be one bits. Alternatively, the wakeup signal may be two bits. A wakeup signal is different form a page and may carry less information than a page. Additionally, or alternatively, a wakeup signal may not require PDCCH and/or PDSCH transmission.

In FIGS. 5A-5C, two UE groups are described, and each UE group is associated with a respective resource pattern. However, the techniques and apparatuses described herein are not limited to two UE groups, and may be applied for any number of UE groups. For example, more UE groups may be envisioned in implementation. Resources belonging to a first resource pattern are shown as WUS1 (wakeup signal 1), and resources belonging to a second resource pattern are shown as WUS2 (wakeup signal 2). In some aspects, a resource pattern may correspond to a single UE group. Additionally, or alternatively, a resource pattern may correspond to an antenna port for transmission of wakeup signals. Additionally, or alternatively, a resource pattern may correspond to an antenna of an antenna port for transmission of wakeup signals. For example, a first resource pattern may be associated with a first antenna and a second resource pattern may be associated with a second antenna. Additionally, or alternatively, a resource pattern may correspond to a precoder set for transmission of wakeup signals. For example, a first resource pattern may be associated with a first precoder set and a second resource pattern may be associated with a second precoder set. A precoder set may include one or more precoder cycling sets, and a precoder cycling may include multiple, different precoder sets. In such cases, two or more resource patterns may be associated with a single UE group.

In some aspects, the wakeup signal resources may be associated with a plurality of resource patterns corresponding to a plurality of UE groups and/or antenna ports (e.g., three resource patterns, five resource patterns, or at least two resource patterns).

Furthermore, in FIGS. 5A-5C, an anchor carrier is shown and described, wherein a subframe (SF) 0 is used for a PBCH, SF 4 is used for a system information block (e.g., SIB1), SF 5 is used for a primary synchronization signal (NPSS), and SF 9 is used for a secondary synchronization signal (NSSS) in the odd radio frame. However, the techniques and apparatuses described herein are applicable for non-anchor carriers, which may not include a PBCH, SIB, NPSS, and/or NSSS.

As shown by reference number 505-1, FIG. 5A shows a first example of a TDM pattern, an antenna port transmission resource pattern, an antenna transmission resource pattern, and/or a precoder set resource pattern. In the first example, resources of the first resource pattern alternate with resources of the second resource pattern. For example, in an anchor carrier, WUS1 may be transmitted on subframes (SFs) 1, 3, and 7, whereas WUS2 may be transmitted on subframes 2, 6, and 8. In a non-anchor carrier, WUS1 may be transmitted on subframes 0, 2, 4, 6, and 8, whereas WUS2 may be transmitted on subframes 1, 3, 5, 7, and 9. In this way, time diversity of wakeup signals for the first UE group and the second UE group is achieved, and robustness against instantaneous interference is improved. In some aspects, WUS1 and/or WUS2 may be transmitted using a same antenna port as the NPSS, the NSSS, and/or a reference signal (e.g., an NRS and/or the like), which reduces delay associated with retuning a receiver of the UE 120.

In some aspects, WUS1 may be transmitted using a first antenna port of BS 110, and WUS2 may be transmitted using a second antenna port of BS 110. Additionally, or alternatively, WUS1 may be transmitted using a first antenna of a particular antenna port, and WUS2 may be transmitted using a second antenna of the particular antenna port. Additionally, or alternatively, WUS1 may be transmitted using a first precoder set, and WUS2 may be transmitted using a second precoder set (e.g., WUS1 and WUS2 may be transmitted by the same antenna and/or antenna port). In such a case, WUS1 and WUS2 may be associated with the same UE group, and the designation of resources as WUS1 or WUS2 may indicate which antenna port, antenna, and/or precoder set is to be used to transmit the wakeup signal in the corresponding resources. Thus, spatial diversity of wakeup signals for the first UE group and the second UE group is achieved.

As shown in FIG. 5B, a second resource pattern 505-2 may transmit WUS1 during subframes 1, 2, and 3 of an anchor carrier, and may transmit WUS2 during subframes 6, 7, and 8 of the anchor carrier. A similar technique may be used for a non-anchor carrier (e.g., subframes 0, 1, 2, 3, and 4 for WUS1 and subframes 5, 6, 7, 8, and 9 for WUS2). This may provide a larger number of simultaneous repetitions of the wakeup signal, which may increase a likelihood of successful reception of the wakeup signal for UEs 120 that require multiple repetitions of the wakeup signal. Additionally, or alternatively, BS 110 may transmit WUS1 using a first antenna port, a first antenna of an antenna port, and/or a first precoder set in subframes 1, 2, and 3, and may transmit WUS2 using a second antenna port, a second antenna of the antenna port, and/or a second precoder set in subframes 6, 7, and 8. In such a case, WUS1 and WUS2 may be associated with a same UE group.

As shown in FIG. 5C, a third resource pattern 505-3 may transmit WUS1 in a first frame 510 (e.g., subframes 1, 2, 3, 6, 7, and 8 of the first frame 510), and may transmit WUS2 in a second frame 515 (e.g., subframes 1, 2, 3, 6, 7, and 8 of the second frame 515). For example, the first frame 510 and the second frame 515 may be consecutive frames. This may further increase a likelihood of reception of the wakeup signal for UEs that use multiple repetitions. This technique may additionally or alternatively be applied for a non-anchor carrier. Additionally, or alternatively, this technique may be applied with regard to a first and second antenna port, a first and second antenna of an antenna port, and/or a first and second precoder set associated with a particular antenna and/or antenna port.

In some aspects, a number of wakeup signals of a resource pattern may be configurable. For example, the BS 110 may specify any number of wakeup signals to be included in the resource patterns of WUS1 and/or WUS2. In this way, versatility of wakeup signaling is improved, and resources may be more efficiently allocated.

In some aspects, when a single wakeup signal (e.g., a single WUS1 or a single WUS2) is to be transmitted, two or more different antenna ports, two or more antennas of an antenna port, and/or two or more precoder sets may be used within a single subframe. For example, a first subset of symbols of the single wakeup signal may be transmitted from a first antenna port, a first antenna, and/or using a first precoder set and a second subset of symbols of the single wakeup signal may be transmitted from a second antenna port, a second antenna, and/or using a second precoder set, thereby improving spatial diversity.

In some aspects, a UE 120 may scan for the wakeup signals. The UE 120 may identify a wakeup signal based at least in part on a preamble of the wakeup signal. For example, the BS 110 may encode the preamble to identify at least a portion of a cell identifier of a camping cell or serving cell associated with the UE 120. Additionally, the BS 110 may encode the preamble to identify at least a portion of a UE group identifier that identifies a UE group of the UE 120. In some aspects, the UE 120 may determine that a wakeup signal is relevant to the UE 120 when the cell identifier and the UE group identifier respectively match a cell identifier and UE group identifier of the UE 120. In some aspects, the UE 120 may determine that a wakeup signal is relevant to the UE 120 when the cell identifier matches a cell identifier of the UE 120. In some aspects, the UE 120 may determine that a wakeup signal is relevant to the UE 120 when the UE group identifier matches a UE group identifier of the UE 120.

In some aspects, a UE 120 may perform synchronization and/or determine a reference value based at least in part on a wakeup signal. For example, the BS 110 may configure a power level for the wakeup signal, and may provide information identifying the power level to the UE 120 (e.g., via a SIB, a radio resource control (RRC) signaling, and/or the like). In some aspects, the information identifying the power level may include a power offset relative to a synchronization signal or reference signal (e.g., PSS, SSS, NPSS, NSSS, RS, NRS, and/or the like). The UE 120 may perform synchronization and/or determine the reference value based at least in part on the power level of the wakeup signal. In some aspects, when no power offset is specified, the UE 120 may use a default offset (e.g., 0 dB and/or the like).

In some aspects, the BS 110 may select a resource for transmission of a wakeup signal based at least in part on a UE group identifier and/or a paging narrowband of a UE 120. For example, the BS 110 may determine the resource using the following equations 1 through 4:

SFN mod $T = (T$ div $N)*(UE\_ID$ mod $N)$      Equation 1:

$i\_s = \text{floor}(UE\_ID/N) \bmod Ns$      Equation 2:

$PNB = \text{floor}(UE\_ID/(N*Ns)) \bmod Nn$      Equation 3:

$UE\_Group\_ID = \text{floor}(UE\_ID/(N*Ns*Nn)) \bmod N\_WUS\_Groups$      Equation 4:

Equation 1 is used to identify a paging frame (e.g., system frame number (SFN) mod T) for the UE 120, wherein T refers to a discontinuous reception (DRX) cycle, N, defined as min{T,nB}, is a minimum value of T and an nB value (e.g., nB values of {4T, 2T, T, T/2, T/4, T/8, T/16, T/32, T/64, T/128, and T/256, and for NB-IoT also T/512, and T/1024), configured in SIB2, and UE_ID is a UE identifier of the UE 120. Equation 2 is the index i_s pointing to a paging occasion (PO) of the UE 120 based at least in part on UE_ID, N, and Ns. Ns, defined as max{1,nB/T}, is a maximum value of 1 and nB/T.

Equation 3 identifies a paging narrowband (PNB) of the UE 120 based at least in part on the UE_ID, N, Ns, and Nn, wherein Nn identifies a number of available narrowbands, and may be provided in system information. Equation 4 identifies a UE group identifier (UE_Group_ID) of the UE 120 based at least in part on the UE_ID, N, Ns, and Nn so that the UEs are further grouped into N_WUS_Groups, wherein N_WUS_Groups identifies a total number of UE groups. In this way, BS 110 and UE 120 can determine a UE group identifier of the UE 120 based at least in part on the parameters of a paging narrowband of the UE 120. The N_WUS_Groups may be predefined or configured in system information and/or RRC signaling within the range of the pre-defined maximum value of N_WUS_Groups. Notably, the approach described above can be performed for any number of UE groups (e.g., any value of N_WUS_Groups).

In some aspects, the BS 110 may provide information to a UE 120 indicating parameters of a preamble, and the UE 120 may identify a relevant wakeup signal based at least in part on the parameters. In such a case, the configuration of the UE grouping for the UE 120 may be transparent. For example, the UE 120 may not know the method/criterion of UE grouping but only know the allocated preamble with the particular UE group identifier and/or cell identifier included in the preamble, and may be searching for the preamble that matches the parameters.

In some aspects, the UE 120 may report or transmit information identifying a capability of the UE 120. For example, the UE 120 may report information identifying whether a receiver of the UE 120 is configured to identify legacy synchronization signals. Additionally, or alternatively, the UE 120 may report information identifying a detection and/or synchronization time of a receiver of the UE 120. Additionally, or alternatively, the UE 120 may report information identifying a synchronization processing time between the wakeup signal and a subsequent communication. For example, the UE 120 may report information indicating whether the UE 120 has a first type of delay (e.g., no delay or 0 ms), a second type of delay (e.g., a shorter delay or approximately 15 ms), or a third type of delay (e.g., a longer delay or approximately 500 ms).

The BS 110 may transmit the communication after the wakeup signal with a particular delay based at least in part on the information identifying the capability of the UE 120. In some aspects, the UE 120 may scan for the communication after the particular delay. Additionally, or alternatively, the UE 120 may scan for the communication for a particular length of time, such as a maximum delay.

In some aspects, a UE 120 may monitor particular resources for a wakeup signal based at least in part on a repetition configuration of the UE 120. For example, a UE 120 may require a particular number of repetitions to successfully decode a communication (e.g., 1 repetition, 4 repetitions, 16 repetitions, 64 repetitions, 2048 repetitions, etc.). It may not be beneficial to awaken a UE 120 for a communication having fewer repetitions than the particular number of repetitions since decoding of the communication is unlikely to succeed.

Therefore, the length of the wakeup signal resources may be configured based at least in part on a repetition configuration of the UE 120. For example, a wakeup signal resource length may be determined based at least in part on a maximum number of repetitions of a communication. A wakeup signal may be transmitted within the wakeup signal resource, and a number of resources used for the wakeup signal may be based at least in part on an actual number of repetitions of the communication.

For example, assume that the maximum number of repetitions of the communication is 2048 repetitions. Assume further that the UE 120 is configured with a reduction factor of 16. The reduction factor may identify a relationship between the number of repetitions of the communication and the number of repetitions of the wakeup signal. In this case, a maximum number of repetitions of the wakeup signal is a value M of 128 repetitions (e.g., 2048/16). If a communication is to start in subframe N, then the wakeup signal resources can start in subframes N−M, N−2M, N−3M, and so on. More particularly, wakeup signal resources for the UE 120 may start at respective subframes N−M, N−2M, N−3M, and N−4M. In other words, the communication may be associated with four wakeup signal resources that start at N−M, N−2M, N−3M, and N−4M.

Now assume that the communication has an actual number of repetitions of 128 repetitions. In that case, and according to the reduction factor, the length of the wakeup signal may be 8 repetitions (e.g., 128/16). In some aspects, the 8 repetitions of the wakeup signal may be transmitted starting at the end of each wakeup signal resource (e.g., N−8, N−7, . . . , N−1). In some aspects, the 8 repetitions of the wakeup signal may be transmitted starting at the beginning of each wakeup resource, (e.g., N−M, N−M+1, . . . , N−M+7). In this way, wakeup signal resources are configured based at least in part on a maximum number of repetitions and an actual number of repetitions of a communication.

As indicated above, FIGS. 5A-5C are provided as examples. Other examples are possible and may differ from what was described with respect to FIGS. 5A-5C.

Figure 6:
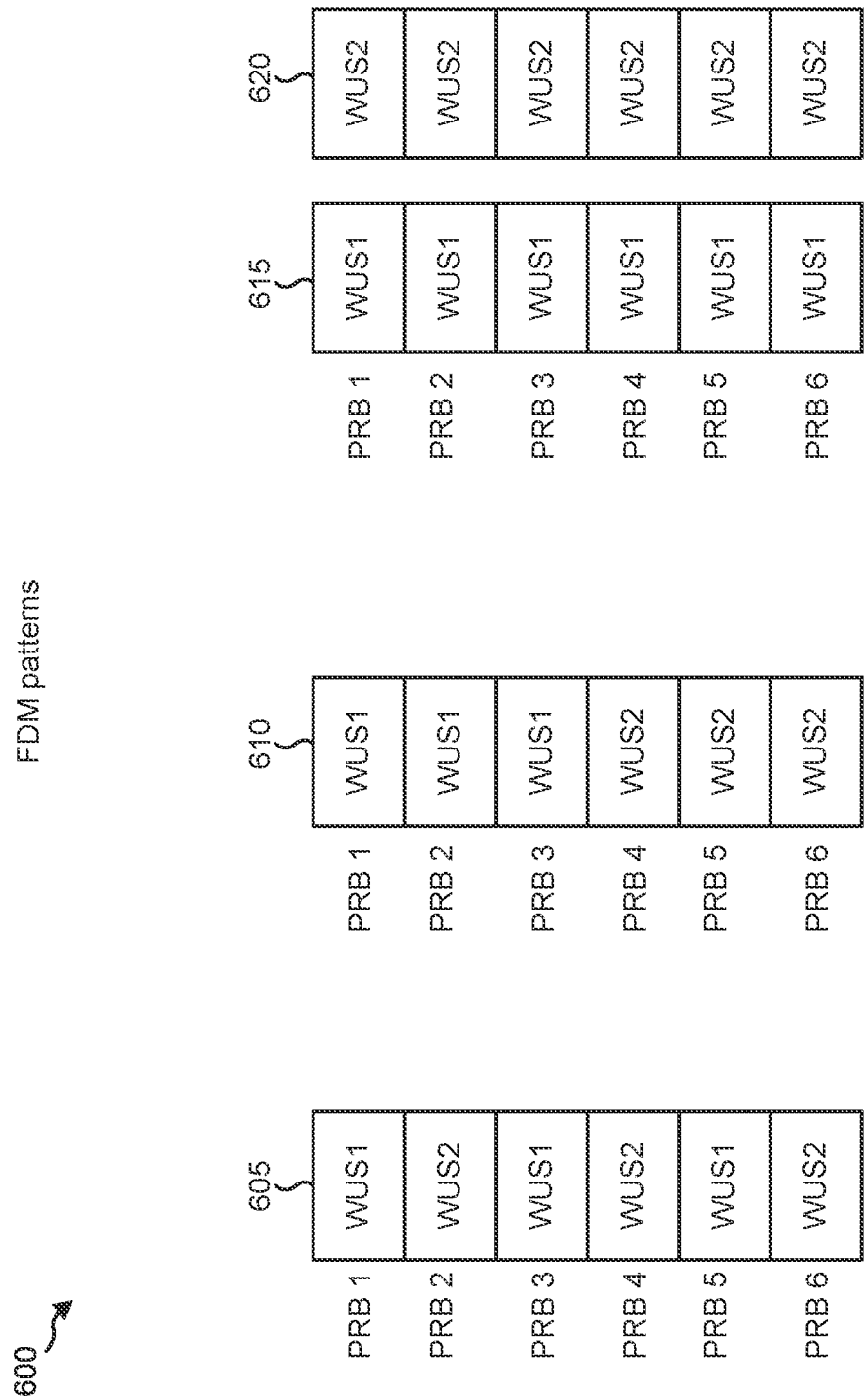
FIG. 6 is a diagram illustrating an example of frequency division multiplexing (FDM) patterns for wakeup signal transmission.

FIG. 6 is a diagram illustrating an example 600 of FDM patterns for wakeup signal transmission. In some aspects, such as the enhanced Machine Type Communications (eMTC) radio access technology, FDM may be used. For example, and as shown in FIG. 6, a set of resources 605, 610, 615, 620 for eMTC communication may include six physical resource blocks (PRBs) that are parallel in frequency. For example, the six PRBs may be associated with a single subframe or frame.

As shown by reference number 605, in some aspects, resources of the resource pattern shown by WUS1 may alternate with resources of the resource pattern shown by WUS2. This may improve frequency diversity of the wakeup signals.

As shown by reference number 610, in some aspects, multiple resources of the resource pattern shown by WUS1 may be allocated contiguously in frequency, and multiple resources of the resource pattern shown by WUS2 may be allocated contiguously in frequency. In this way, UEs that use multiple repetitions may be able to decode the wakeup signal.

As shown by reference number 615 and 620, in some aspects, a full bandwidth of a first frame or subframe may be allocated for WUS1, and a full bandwidth of a second frame or subframe may be allocated for WUS2. In this way, a likelihood of decoding of the wakeup signal for UEs that require multiple repetitions may be further improved.

In some aspects, resources may be allocated for the wakeup signals using a frequency hopping technique. For example, the BS 110 may configure, for a UE 120, a starting subframe index, a frequency offset, and/or a hopping time for frequency hopping. The BS 110 may allocate resources for transmission of the wakeup signal according to the starting subframe index, the frequency offset, and/or the hopping time.

As indicated above, FIG. 6 is provided as an example. Other examples are possible and may differ from what was described with respect to FIG. 6.

Figure 7:
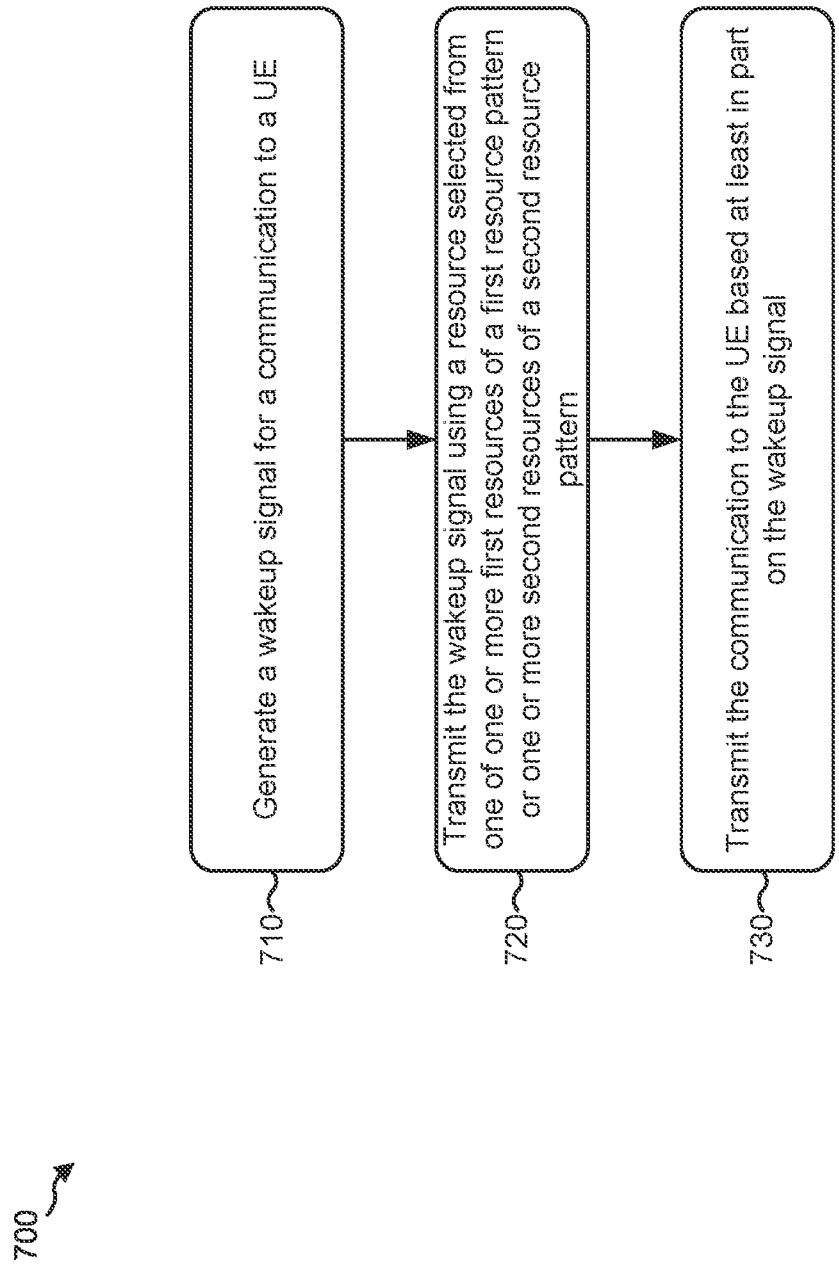
FIG. 7 is a flow chart of a method of wireless communication.

FIG. 7 is a flow chart of a method 700 of wireless communication. The method may be performed by a base station (e.g., the BS 110 of FIG. 1, apparatus 1102/1102', and/or the like).

At 710, the base station may generate a wakeup signal for a communication to a UE. For example, the wakeup signal may include a preamble identifying a UE group of the UE and/or a cell identifier of a cell of the UE. The base station may provide the wakeup signal to cause the UE to wake up or exit an idle or dormant mode to receive the communication.

At 720, the base station may transmit the wakeup signal using a resource selected from one or more first resources of a first resource pattern or one or more second resources of a second resource pattern. For example, the first resource pattern may be associated with a first UE group, and the second resource pattern may be associated with a second UE group. The base station may select the resource, of the one or more first resources or the one or more second resources, based at least in part on whether the wakeup signal is to be transmitted to the first UE group or the second UE group. In some aspects, the base station may select a resource from three or more resource patterns (e.g., when the base station performs resource allocation for three or more UE groups corresponding to the three or more resource patterns).

In some aspects, the one or more first resources alternate with the one or more second resources in a time domain. In some aspects, the one or more first resources are in a first set of subframes and the one or more second resources are in a second set of subframes. In some aspects, the first resource pattern is associated with a first antenna port and the second resource pattern is associated with a second antenna port. In some aspects, the first resource pattern is associated with a first antenna of an antenna port and the second resource pattern is associated with a second antenna of the antenna port. In some aspects, the first resource pattern is associated with a first precoder set and the second resource pattern is associated with a second precoder set. In some aspects, the one or more first resources and the one or more second resources are included in an anchor carrier. In some aspects, the one or more first resources and the one or more second resources are included in a non-anchor carrier. In some aspects, the wakeup signal is transmitted using a same antenna port as a synchronization signal or reference signal for the UE.

In some aspects, the wakeup signal is transmitted using two or more antenna ports within a single subframe. In some aspects, a number of the one or more first resources or a number of the one or more second resources is configurable. In some aspects, the one or more first resources and the one or more second resources comprise physical resource blocks (PRBs). In some aspects, the one or more first resources alternate with the one or more second resources in a frequency domain. In some aspects, resources of the one or more first resources or the one or more second resources vary in a time domain and a frequency domain.

In some aspects, a preamble of the wakeup signal identifies a UE group, of the first UE group and the second UE group, with which the wakeup signal is associated. Additionally, or alternatively, a preamble of the wakeup signal identifies a cell with which the UE is associated.

In some aspects, configuration information identifying the first UE group and the second UE group is provided in system information. In some aspects, a transmission power of the wakeup signal is configured based at least in part on a power offset relative to a synchronization signal transmitted by the base station. In some aspects, a UE group, of the first UE group and the second UE group, is assigned to the UE based at least in part on a paging narrowband of the UE. In some aspects, the wakeup signal is identified further based at least in part on a parameter of a preamble of the wakeup signal, wherein the UE is configured to detect the parameter of the preamble.

In some aspects, the resource is selected based at least in part on a maximum number of repetitions of the communication (e.g., the communication described in connection with block 720, below). In some aspects, the resource is selected based at least in part on an actual number of repetitions of the communication. In some aspects, the one or more first resources and the one or more second resources are multiplexed with resources associated with at least one other UE group of a plurality of UE groups including the first UE group and the second UE group.

At 730, the base station may transmit a communication to a UE based at least in part on the wakeup signal. For example, the communication may include a downlink channel. The base station may transmit the communication to the UE after transmitting the wakeup signal to the UE so that the UE scans to receive the communication (e.g., wakes up from an idle mode, and/or the like). In some aspects, the communication is transmitted after a particular delay based at least in part on a capability of the UE. For example, the capability may relate to at least one of a receiver type of the UE or a synchronization processing time of the UE. Additionally, or alternatively, the communication may be transmitted before a maximum delay has elapsed.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
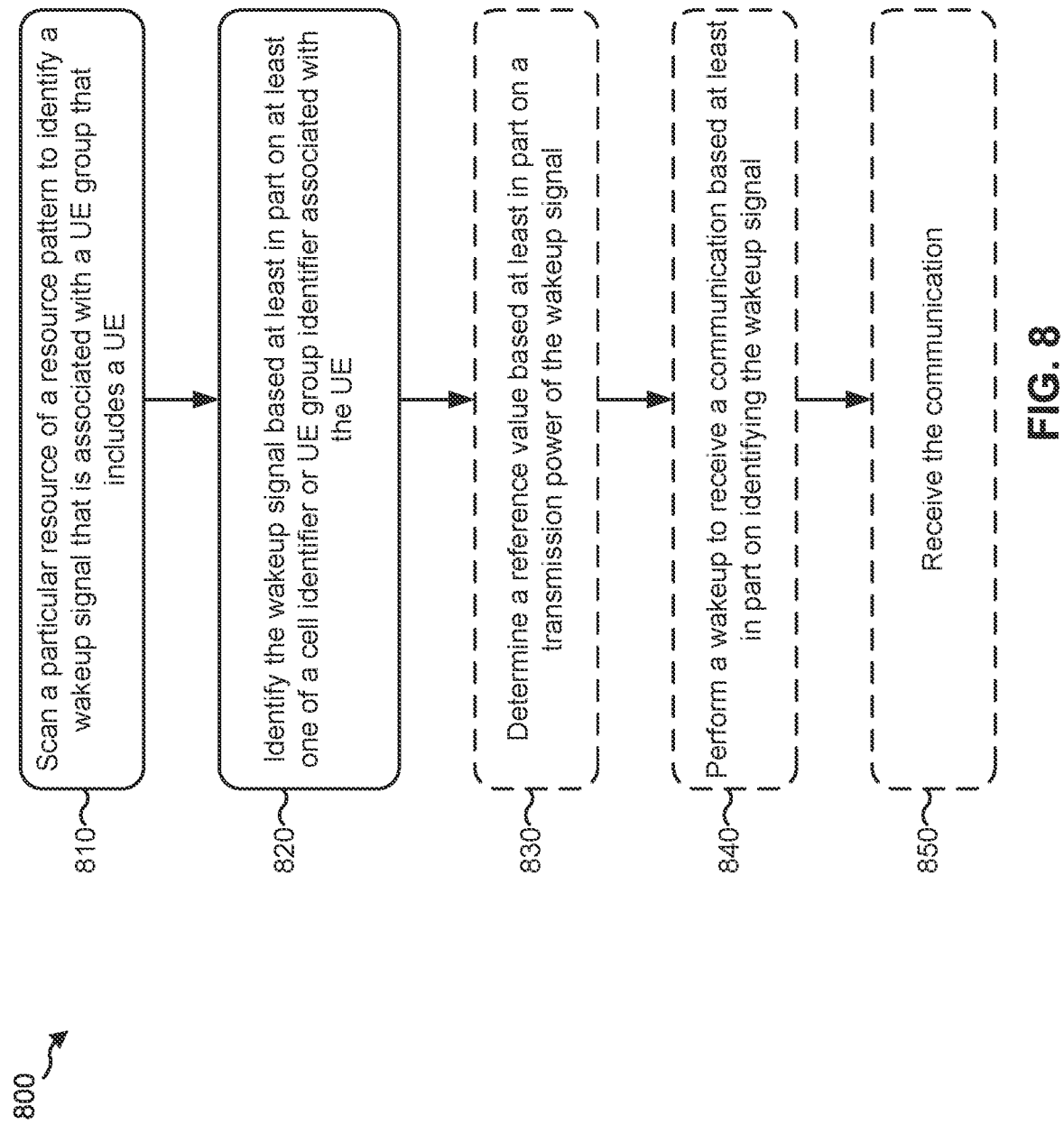
FIG. 8 is a flow chart of a method of wireless communication.

FIG. 8 is a flow chart of a method 800 of wireless communication. The method may be performed by a UE (e.g., the UE 120 of FIG. 1, apparatus 1302/1302', and/or the like).

At 810, the UE may scan a particular resource of a resource pattern to identify a wakeup signal that is associated with a UE group that includes the UE. For example, the resource pattern may be associated with the UE group. The UE may scan the particular resource to identify a wakeup signal directed to the UE group. The wakeup signal may cause UEs of the UE group to perform a wakeup and/or receive a subsequent communication. In some aspects, configuration information, indicating that the UE is associated with the UE group, is received by the UE in system information.

In some aspects, the UE group is assigned to the UE based at least in part on the parameters of a paging narrowband of the UE and at least in part on the parameter of the number of the UE groups. For example, the number of the UE groups may be any integer. In some aspects, a length of the particular resource is based at least in part on a maximum number of repetitions associated with a communication to be received by the UE. In some aspects, the particular resource is one of a plurality of resources scanned by the UE for the wakeup signal, wherein the plurality of resources are determined based at least in part on a maximum number of repetitions and an actual number of repetitions associated with the communication. In some aspects, the UE is configured to determine the UE group based at least in part on a total number of UE groups. In some aspects, the UE group is configured or defined before the wakeup message is detected.

At 820, the UE may identify the wakeup signal based at least in part on at least one of a cell identifier or UE group identifier associated with the UE. For example, at least a portion of the cell identifier and/or at least a portion of a UE group identifier may be identified by a preamble the wakeup signal. The UE may identify the wakeup signal based at least in part on the preamble.

In some aspects, the portion of the UE group identifier is identified by a preamble of the wakeup signal. In some aspects, the wakeup signal is identified further based at least in part on a parameter of a preamble of the wakeup signal, wherein the UE is configured to detect the parameter of the preamble.

At 830, the UE may optionally determine a reference value based at least in part on a transmission power of the wakeup signal. For example, the transmission power may be based at least in part on a power offset relative to a synchronization signal received by the UE. In this way, the UE may conserve network resources that would otherwise be used to transmit and/or use a separate synchronization signal to determine the reference value.

At 840, the UE may optionally perform a wakeup to receive a communication based at least in part on identifying the wakeup signal. For example, the UE may wake up to receive paging at a particular time based at least in part on identifying the wakeup signal. In some aspects, the UE may remain awake for a particular length of time after receiving the wakeup signal, as described in more detail elsewhere herein.

At 850, the UE may optionally receive the communication. For example, the UE may receive the communication after performing the wakeup. In some aspects, the communication is received after a particular delay based at least in part on a capability of the UE. In some aspects, the UE may transmit information identifying the capability to a base station that transmits the communication. In some aspects, the capability relates to at least one of a receiver type of the UE or a synchronization processing time of the UE. In some aspects, the communication is received before a maximum delay has elapsed. The UE may scan for the communication between the wakeup signal and a time associated with the maximum delay.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
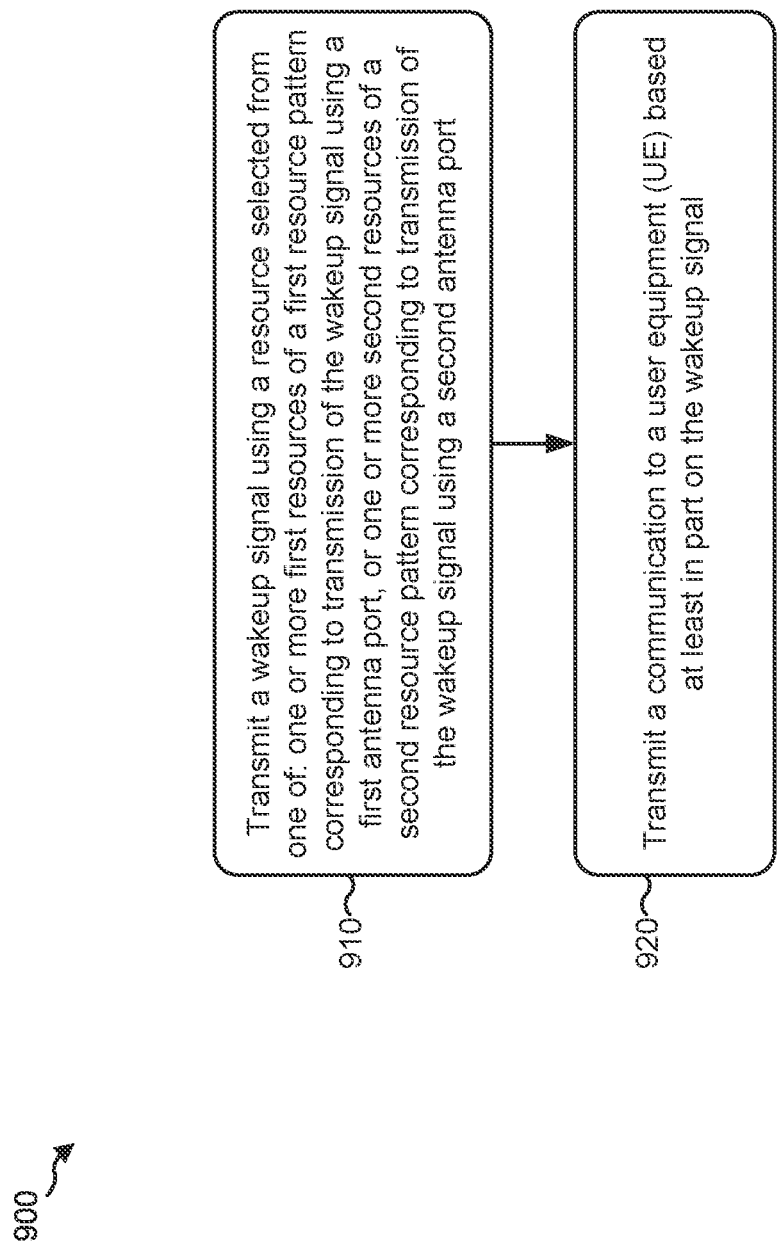
FIG. 9 is a flow chart of a method of wireless communication.

FIG. 9 is a flow chart of a method 900 of wireless communication. The method may be performed by a base station (e.g., the BS 110 of FIG. 1, apparatus 1102/1102', and/or the like).

At 910, the base station may transmit a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port.

At 920, the base station may transmit a communication to a user equipment (UE) based at least in part on the wakeup signal.

In some aspects, method 900 may include additional aspects, such as one or more aspects described below and/or in connection with one of more other methods described herein.

In some aspects, the one or more first resources are in a first set of subframes and the one or more second resources are in a second set of subframes. In some aspects, resources of the one or more first resources or the one or more second resources vary in at least one of a time domain or a frequency domain. In some aspects, the one or more first resources and the one or more second resources are included in an anchor carrier. In some aspects, the one or more first resources and the one or more second resources are included in a non-anchor carrier. In some aspects, the one or more first resources and the one or more second resources are included in a same narrowband as the communication.

In some aspects, the one or more first resources and the one or more second resources include resources that do not carry a physical broadcast channel, a primary synchronization signal, or a secondary synchronization signal. In some aspects, the one or more first resources and the one or more second resources comprise physical resource blocks in a frequency domain. In some aspects, a frequency offset of the one or more first resources and the one or more second resources is indicated to the UE. In some aspects, a preamble of the wakeup signal identifies a UE group. In some aspects, a preamble of the wakeup signal identifies a cell.

In some aspects, the wakeup signal is used for performing synchronization. In some aspects, a transmission power of the wakeup signal is configured based at least in part on a power offset relative to a synchronization signal or a reference signal. In some aspects, the communication is transmitted after a delay or gap between the wakeup signal and the communication, wherein the delay or gap is configured based at least in part on a UE capability. In some aspects, the UE capability relates to at least one of a receiver type of the UE or a processing time of the UE, wherein the processing time is pre-defined or reported by the UE.

In some aspects, a number of resources for a maximum duration of the wakeup signal is selected based at least in part on a maximum number of repetitions of the communication. In some aspects, a number of resources for an actual duration of the wakeup signal is selected based at least in part on an actual number of repetitions of the communication. In some aspects, the resource is a starting subframe for transmission of the wakeup signal, and wherein the starting subframe is determined based at least in part on: a starting subframe of the communication, a maximum duration of the wakeup signal, and a gap between the communication and an end of the maximum duration of the wakeup signal.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
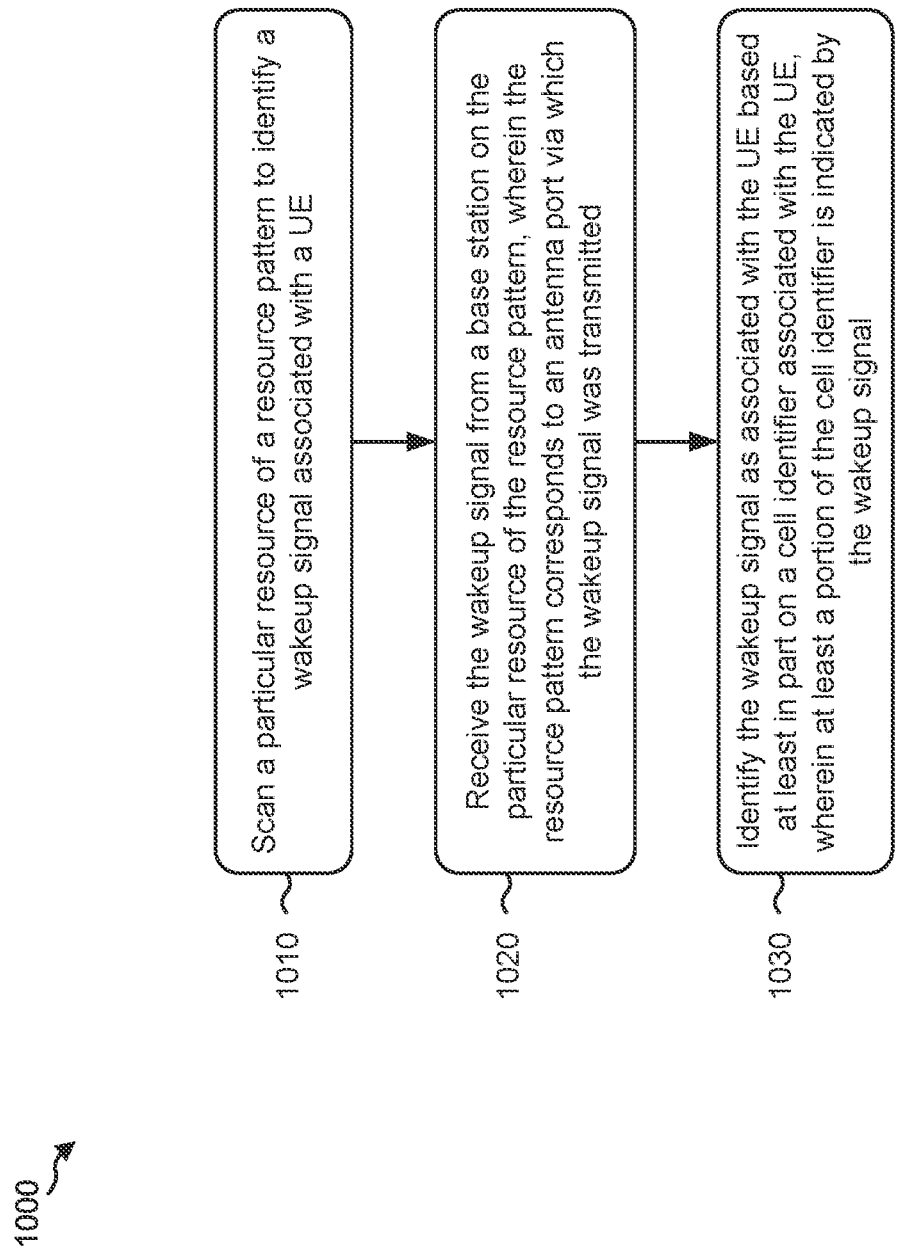
FIG. 10 is a flow chart of a method of wireless communication.

FIG. 10 is a flow chart of a method 1000 of wireless communication. The method may be performed by a UE (e.g., the UE 120 of FIG. 1, apparatus 1302/1302', and/or the like).

At 1010, the UE may scan a particular resource of a resource pattern to identify a wakeup signal associated with the UE.

At 1020, the UE may receive the wakeup signal from a base station on the particular resource of the resource pattern, wherein the resource pattern corresponds to an antenna port via which the wakeup signal was transmitted.

At 1030, the UE may identify the wakeup signal as associated with the UE based at least in part on a cell identifier associated with the UE, wherein at least a portion of the cell identifier is indicated by the wakeup signal.

In some aspects, method 1000 may include additional aspects, such as one or more aspects described below and/or in connection with one of more other methods described herein.

In some aspects, the resource pattern includes a set of subframes in which a same antenna port is used for transmission of the wakeup signal. In some aspects, the particular resource is a resource that does not carry a physical broadcast channel, a primary synchronization signal, or a secondary synchronization signal. In some aspects, the wakeup signal is further identified based at least in part on a UE group identifier, wherein at least a portion of the UE group identifier is indicated by the wakeup signal. In some aspects, the wakeup signal is used for performing synchronization.

In some aspects, the UE may be configured to wake up from a sleep state to receive a communication based at least in part on identifying the wakeup signal; and receive the communication. In some aspects, the communication is received after a delay or gap between the wakeup signal and the communication, wherein the delay or gap is configured based at least in part on a UE capability. In some aspects, the UE may be configured to transmit information identifying the UE capability to a base station that transmits the communication. In some aspects, the UE capability relates to at least one of a receiver type of the UE or a processing time of the UE, wherein the processing time is pre-defined or reported by the UE.

In some aspects, a maximum duration of the particular resource is based at least in part on a maximum number of repetitions associated with a communication scheduled for the UE. In some aspects, an actual duration of the particular resource is based at least in part on an actual number of repetitions associated with a communication scheduled for the UE. In some aspects, the particular resource is a starting subframe for reception of the wakeup signal, and wherein the starting subframe is determined based at least in part on: a starting subframe of the communication, a maximum duration of the wakeup signal, and a gap between the communication and an end of the maximum duration of the wakeup signal. In some aspects, the particular resource is one of a plurality of resources scanned by the UE for the wakeup signal, wherein the plurality of resources are determined based at least in part on at least one of a maximum number of repetitions or an actual number of repetitions associated with a communication to be received by the UE.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
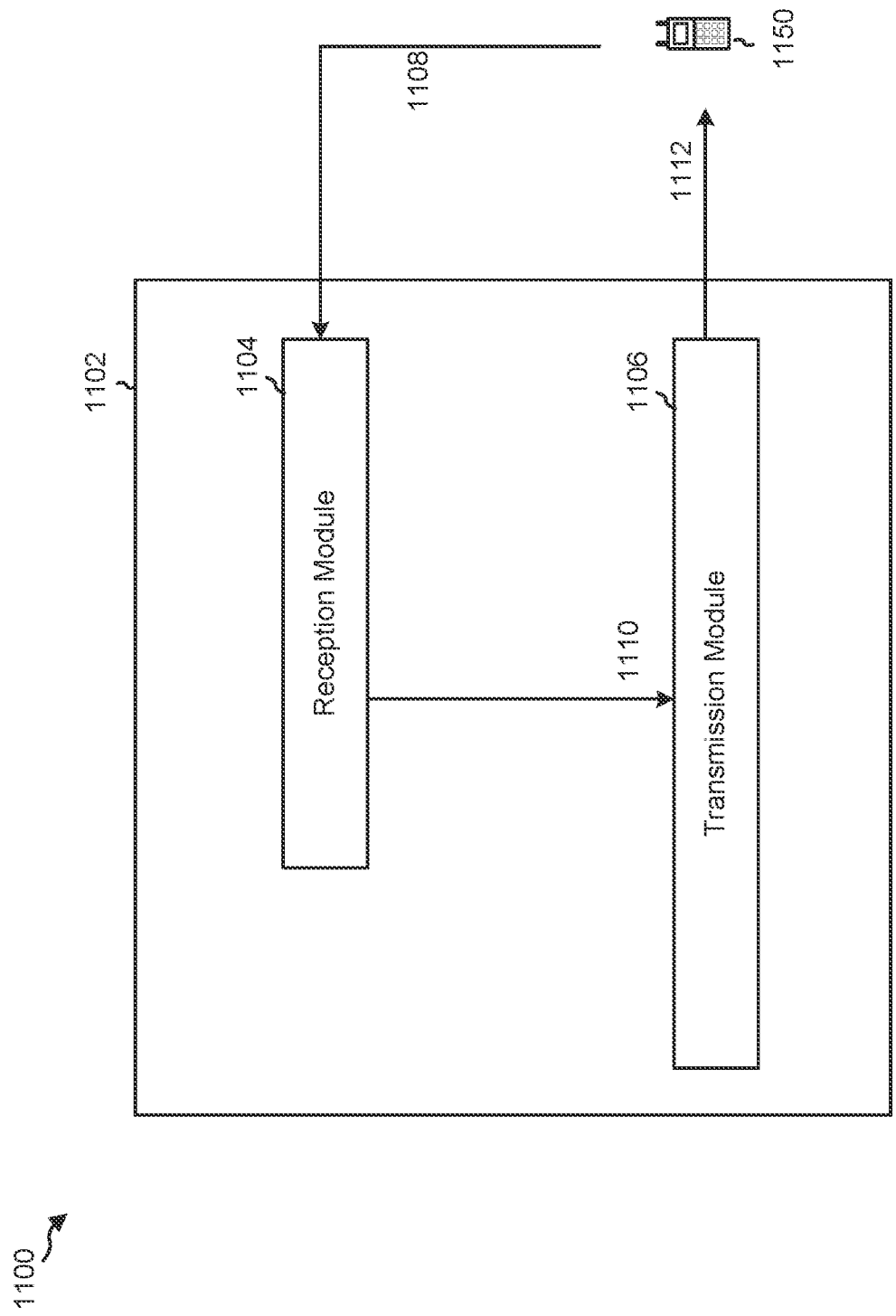
FIG. 11 is a conceptual data flow diagram illustrating the data flow between different modules/means/components in an example apparatus.

FIG. 11 is a conceptual data flow diagram 1100 illustrating the data flow between different modules/means/components in an example apparatus 1102. The apparatus 1102 may be a base station, such as an eNB, a gNB, and/or the like. In some aspects, the apparatus 1102 includes a reception module 1104 and a transmission module 1106.

The reception module 1104 may receive signals 1108 from a UE 1150 (e.g., the UE 120 and/or the like). In some aspects, the signals 1108 may identify a capability of the UE 1150. The reception module may provide data 1110 to the transmission module 1106. The data 1110 may identify the capability.

The transmission module 1106 may transmit a wakeup signal and/or a communication based at least in part on the wakeup signal. For example, the transmission module 1106 may generate a signal 1112, and the apparatus 1102 may transmit the signal 1112 to the UE 1150. The signal 1112 may include the wakeup signal, the communication, and/or other information.

The apparatus may include additional modules that perform each of the blocks of the algorithm in the aforementioned flow chart of FIG. 7, FIG. 9, and/or the like. As such, each block in the aforementioned flow chart of FIG. 7, FIG. 9, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 11 are provided as an example. In practice, there may be additional modules, fewer modules, different modules, or differently arranged modules than those shown in FIG. 11. Furthermore, two or more modules shown in FIG. 11 may be implemented within a single module, or a single module shown in FIG. 11 may be implemented as multiple, distributed modules. Additionally, or alternatively, a set of modules (e.g., one or more modules) shown in FIG. 11 may perform one or more functions described as being performed by another set of modules shown in FIG. 11.

Figure 12:
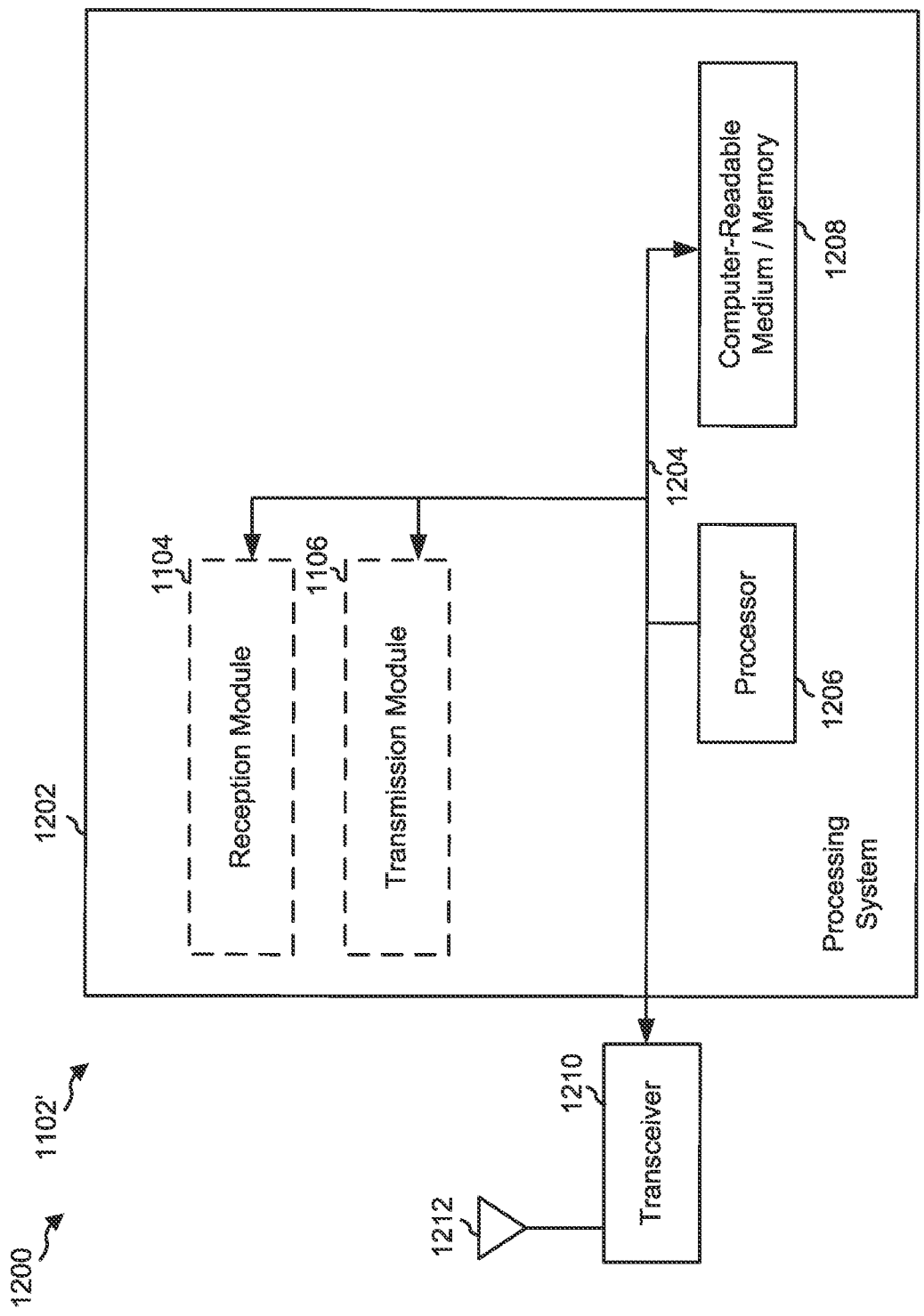
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a base station, such as an eNB, a gNB, and/or the like.

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware modules, represented by the processor 1206, the modules 1104, 1106, and the computer-readable medium/memory 1208. The bus 1204 may also link various other circuits such as timing sources, peripherals, voltage regulators, and power management circuits, which are well known in the art, and therefore, will not be described any further.

The processing system 1202 may be coupled to a transceiver 1210. The transceiver 1210 is coupled to one or more antennas 1212. The transceiver 1210 provides a means for communicating with various other apparatus over a transmission medium. The transceiver 1210 receives a signal from the one or more antennas 1212, extracts information from the received signal, and provides the extracted information to the processing system 1202, specifically the reception module 1104. In addition, the transceiver 1210 receives information from the processing system 1202, specifically the transmission module 1106, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described supra for any particular apparatus. The computer-readable medium/memory 1208 may also be used for storing data that is manipulated by the processor 1206 when executing software. The processing system further includes at least one of the modules 1104 and 1106. The modules may be software modules running in the processor 1206, resident/stored in the computer-readable medium/memory 1208, one or more hardware modules coupled to the processor 1206, or some combination thereof. The processing system 1202 may be a component of the BS 110 and may include the memory 242 and/or at least one of the TX MIMO processor 230, the receive processor 238, and/or the controller/processor 240.

In some aspects, the apparatus 1102/1102' for wireless communication includes means for transmitting a wakeup signal, means for transmitting a communication based at least in part on the wakeup signal, and/or the like. Additionally, or alternatively, the apparatus 1102/1102' for wireless communication may include means for transmitting a wakeup signal using a resource selected from one of: one or more first resources of a first resource pattern corresponding to transmission of the wakeup signal using a first antenna port, or one or more second resources of a second resource pattern corresponding to transmission of the wakeup signal using a second antenna port; means for transmitting a communication to a user equipment (UE) based at least in part on the wakeup signal; and/or the like. The aforementioned means may be one or more of the aforementioned modules of the apparatus 1102 and/or the processing system 1202 of the apparatus 1102' configured to perform the functions recited by the aforementioned means. As described supra, the processing system 1202 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 12 is provided as an example. Other examples are possible and may differ from what was described in connection with FIG. 12.

Figure 13:
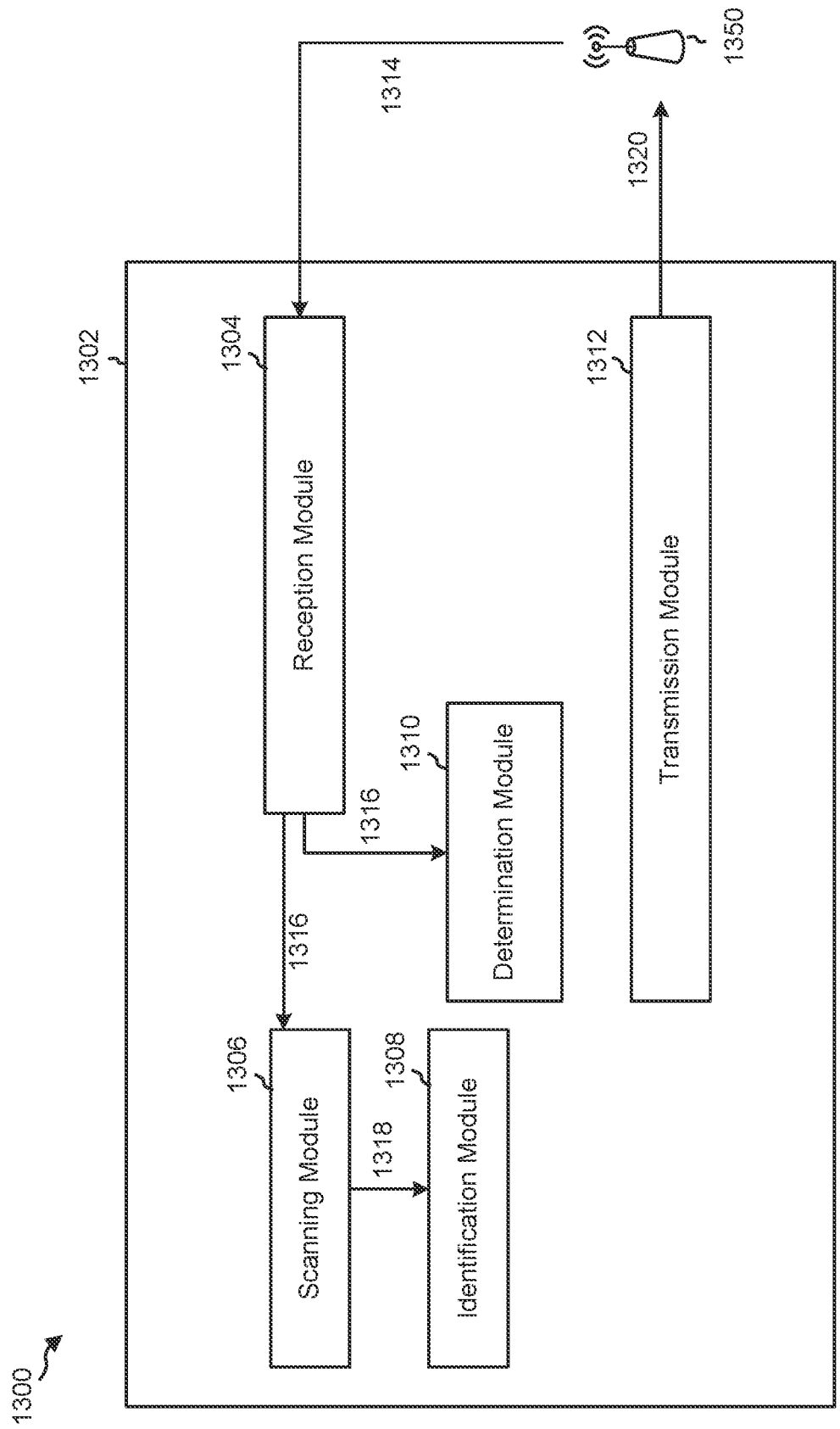
FIG. 13 is a conceptual data flow diagram illustrating the data flow between different modules/means/components in an example apparatus.

FIG. 13 is a conceptual data flow diagram 1300 illustrating the data flow between different modules/means/components in an example apparatus 1302. The apparatus 1302 may be a UE. In some aspects, the apparatus 1302 includes a reception module 1304, a scanning module 1306, an identification module 1308, a determination module 1310, and/or a transmission module 1312.

The reception module 1304 may receive signals 1314 from a BS 1350. In some aspects, the signals 1314 may include a wakeup signal and/or a communication associated with the wakeup signal. The reception module 1304 may process the signals 1314 and may provide data 1316 to the scanning module 1306 and/or the determination module 1310 based at least in part on the signals 1314.

The scanning module 1306 may scan a particular resource of a resource pattern to identify a wakeup signal that is associated with a UE group, wherein the resource pattern is associated with the UE group, and may provide data 1318 to the identification module 1308 based at least in part on the scanning. The identification module 1308 may identify the wakeup signal based at least in part on at least one of a cell identifier or UE group identifier, wherein at least a portion of the cell identifier or a portion of the UE group identifier is identified by the wakeup signal.

The determination module 1310 may determine a reference value based at least in part on a transmission power of the wakeup signal, wherein the transmission power is based at least in part on a power offset relative to a synchronization signal received by the apparatus 1302.

The transmission module 1312 may transmit signals 1320. In some aspects, the signals 1320 may identify a capability of the apparatus 1302.

The apparatus may include additional modules that perform each of the blocks of the algorithm in the aforementioned flow chart of FIG. 8, FIG. 10, and/or the like. As such, each block in the aforementioned flow chart of FIG. 8, FIG. 10, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 13 are provided as an example. In practice, there may be additional modules, fewer modules, different modules, or differently arranged modules than those shown in FIG. 13. Furthermore, two or more modules shown in FIG. 13 may be implemented within a single module, or a single module shown in FIG. 13 may be implemented as multiple, distributed modules. Additionally, or alternatively, a set of modules (e.g., one or more modules) shown in FIG. 13 may perform one or more functions described as being performed by another set of modules shown in FIG. 13.

Figure 14:
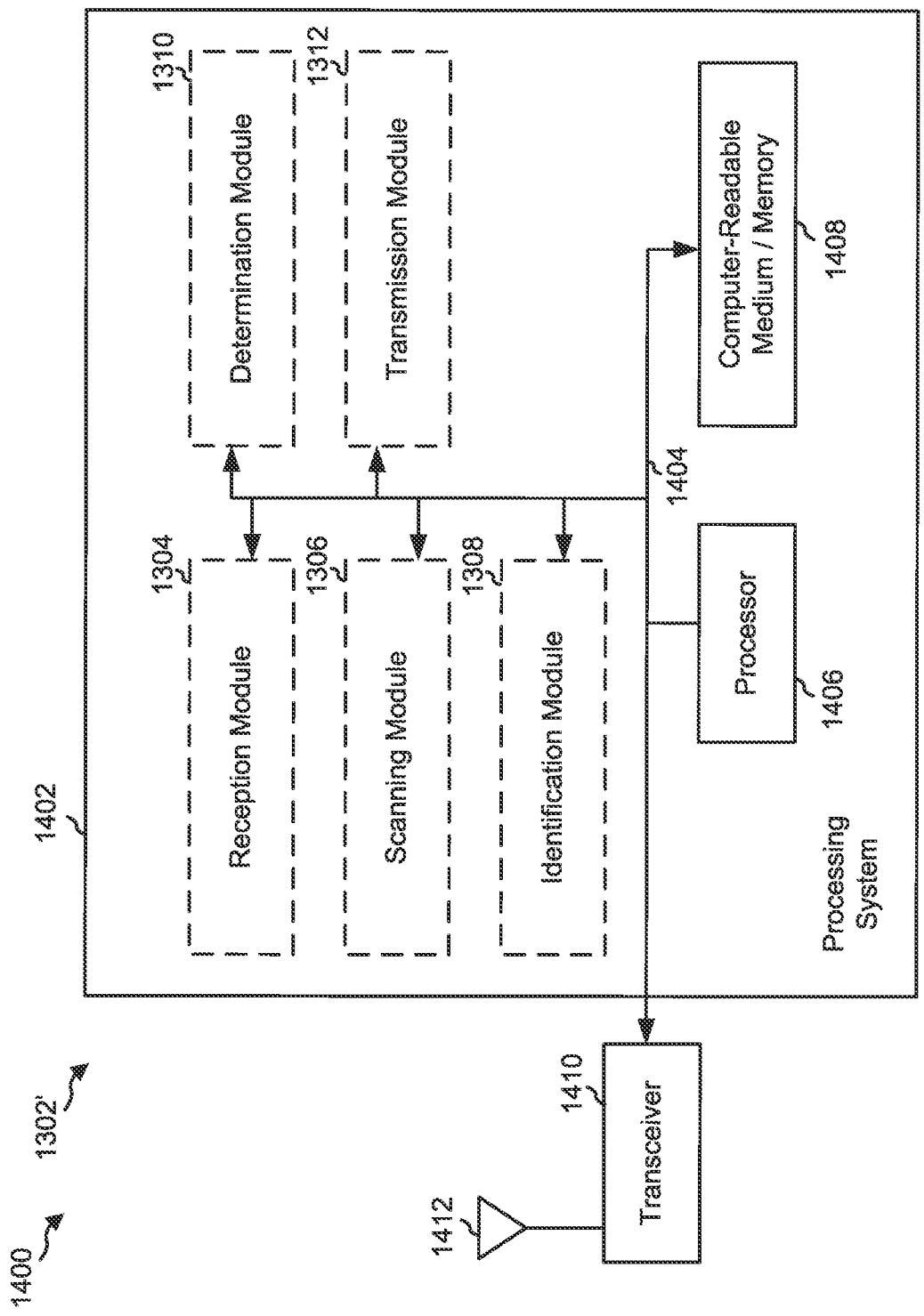
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a UE.

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware modules, represented by the processor 1406, the modules 1304, 1306, 1308, 1310, 1312, and the computer-readable medium/memory 1408. The bus 1404 may also link various other circuits such as timing sources, peripherals, voltage regulators, and power management circuits, which are well known in the art, and therefore, will not be described any further.

The processing system 1402 may be coupled to a transceiver 1410. The transceiver 1410 is coupled to one or more antennas 1412. The transceiver 1410 provides a means for communicating with various other apparatus over a transmission medium. The transceiver 1410 receives a signal from the one or more antennas 1412, extracts information from the received signal, and provides the extracted information to the processing system 1402, specifically the reception module 1304. In addition, the transceiver 1410 receives information from the processing system 1402, specifically the transmission module 1312 and based at least in part on the received information, generates a signal to be applied to the one or more antennas 1412. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described supra for any particular apparatus. The computer-readable medium/memory 1408 may also be used for storing data that is manipulated by the processor 1406 when executing software. The processing system further includes at least one of the modules 1304, 1306, 1308, 1310, and 1312. The modules may be software modules running in the processor 1406, resident/stored in the computer-readable medium/memory 1408, one or more hardware modules coupled to the processor 1406, or some combination thereof. The processing system 1402 may be a component of the UE 120 and may include the memory 282 and/or at least one of the TX MIMO processor 266, the RX processor 258, and/or the controller/processor 280.

In some aspects, the apparatus 1302/1302' for wireless communication includes means for scanning a particular resource of a resource pattern to identify a wakeup signal that is associated with a UE group that includes the apparatus 1302/1302', wherein the resource pattern is associated with the UE group; means for identifying the wakeup signal based at least in part on at least one of a cell identifier or UE group identifier associated with the apparatus 1302/1302', wherein at least a portion of the cell identifier or a portion of the UE group identifier is identified by the wakeup signal; means for determining a reference value based at least in part on a transmission power of the wakeup signal, wherein the transmission power is based at least in part on a power offset relative to a synchronization signal received by the apparatus 1302/1302'; means for performing a wakeup to receive a communication based at least in part on identifying the wakeup signal; means for receiving the communication; and/or means for scanning for the communication between the wakeup signal and a time associated with the maximum delay. Additionally, or alternatively, the apparatus 1302/1302' for wireless communication may include means for scanning a particular resource of a resource pattern to identify a wakeup signal associated with the UE; means for receiving the wakeup signal from a base station on the particular resource of the resource pattern, wherein the resource pattern corresponds to an antenna port via which the wakeup signal was transmitted; means for identifying the wakeup signal as associated with the UE based at least in part on a cell identifier associated with the UE, wherein at least a portion of the cell identifier is indicated by the wakeup signal; and/or the like. The aforementioned means may be one or more of the aforementioned modules of the apparatus 1302 and/or the processing system 1402 of the apparatus 1302' configured to perform the functions recited by the aforementioned means. As described supra, the processing system 1402 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 14 is provided as an example. Other examples are possible and may differ from what was described in connection with FIG. 14.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   determining the starting subframe associated with wakeup signal transmission, wherein the starting subframe is determined based at least in part on:
   a starting subframe of a paging occasion,
   a maximum duration of the wakeup signal transmission, and
   a gap between the paging occasion and an end of the maximum duration of the wakeup signal transmissions;
   scanning for a wakeup signal on a plurality of resources including the starting subframe;
   receiving the wakeup signal on the starting subframe; and
   identifying the wakeup signal as associated with the UE based at least in part on a cell identifier associated with the UE, wherein the wakeup signal is based, at least in part, on the cell identifier.

2. The method of claim 1, wherein the plurality of resources includes a set of subframes in which a same antenna port is used for transmission of the wakeup signal.

3. The method of claim 1, wherein the plurality of resources include subframes that carry a physical broadcast channel, a primary synchronization signal, or a secondary synchronization signal.

4. The method of claim 1, wherein the wakeup signal is further based, at least in part, on a UE group identifier.

5. The method of claim 1, further comprising:
   waking up from a low power state to receive a communication during the paging occasion based at least in part on identifying the wakeup signal; and
   receiving the communication.

6. The method of claim 5, wherein the communication is received after a gap between the wakeup signal and the paging occasion, wherein the gap is configured based, at least in part, on a UE capability.

7. The method of claim 6, further comprising transmitting information identifying the UE capability to a base station.

8. The method of claim 7, wherein the UE capability relates to a processing time of the UE, wherein the processing time is reported by the UE.

9. The method of claim 1, wherein the maximum duration of the wakeup signal transmission is based at least in part on a maximum number of repetitions associated with wakeup signal transmission.

10. The method of claim 9, wherein an actual duration of the wakeup signal is based at least in part on the maximum duration of the wakeup signal transmission.

11. The method of claim 1, wherein the wakeup signal and communication are transmitted on a same narrowband.

12. The method of claim 1, wherein the plurality of resources does not include subframe that carry a physical broadcast channel, a primary synchronization signal, or a secondary synchronization signal.

13. The method of claim 1, wherein a preamble of the wakeup signal is based, at least in part, on a UE group.

14. The method of claim 1, wherein a preamble of the wakeup signal is based, at least in part, on a cell identity.

15. The method of claim 1, wherein the communication is transmitted after a gap between the wakeup signal and the communication, wherein the gap is configured based, at least in part, on a UE capability.

16. The method of claim 15, wherein the UE capability relates to a processing time of the UE, wherein the processing time is reported by the UE.

17. The method of claim 1, wherein the maximum duration of the wakeup signal corresponds to a maximum number of repetitions.

18. The method of claim 17, wherein an actual duration of the wakeup signal is based, at least in part, on the maximum duration.

19. A method of wireless communication performed by a base station, comprising:
   transmitting a wakeup signal on a plurality of resources, the plurality of resource including a starting subframe for transmission of the wakeup signal;
   transmitting a communication to a user equipment (UE) during a paging occasion after transmission of the wakeup signal;
   wherein the starting subframe is determined based at least in part on:
   a starting subframe of the paging occasion,
   a maximum duration of the wakeup signal, and
   a gap between the paging occasion and an end of the maximum duration of the wakeup signal.

20. The method of claim 19, wherein the plurality of resources corresponds to a set of subframes associated with a same antenna port.

21. The method of claim 19, wherein the plurality of resources corresponds to a first set of subframes associated with a first antenna port and a second set of subframes associated with a second antenna port.

22. A user equipment for wireless communication, comprising: memory; and
   one or more processors operatively coupled to the memory, the memory and the one or more processors configured to:
   determine the starting subframe associated with wakeup signal transmission, wherein the starting subframe is determined based at least in part on:
   a starting subframe of a paging occasion,
   a maximum duration of the wakeup signal transmission, and
   a gap between the paging occasion and an end of the maximum duration of the wakeup signal transmissions;
   scan for a wakeup signal on a plurality of resources including the starting subframe;
   receive the wakeup signal on the starting subframe; and identify the wakeup signal as associated with the UE based at least in part on a cell identifier associated with the UE, wherein the wakeup signal is based, at least in part, on the cell identifier.

23. The user equipment of claim 22, wherein the plurality of resources includes a set of subframes in which a same antenna port is used for transmission of the wakeup signal.

24. The user equipment of claim 23, wherein the plurality of resources includes subframes that carry a physical broadcast channel, a primary synchronization signal, or a secondary synchronization signal.

25. The user equipment of claim 24, wherein the wakeup signal is further based, at least in part, on a UE group identifier.

26. The user equipment of claim 25, wherein the one or more processors is further configured to:
    wake up from a low power state to receive a communication during the paging occasion based at least in part on identifying the wakeup signal; and
    receive the communication.

27. The user equipment of claim 26, wherein the one or more processors is further configured to receive the communication after a gap between the wakeup signal and the paging occasion, wherein the gap is configured based, at least in part, on a UE capability.

28. The user equipment of claim 27, wherein the one or more processors is further configured to transmit information identifying the UE capability to a base station.

29. The user equipment of claim 28, wherein the UE capability relates to a processing time of the UE, wherein the processing time is reported by the UE.

30. A base station for wireless communication, comprising:
    memory; and
    one or more processors operatively coupled to the memory, the one or more processors configured to:
        transmit a wakeup signal on a plurality of resources, the plurality of resource including a starting subframe for transmission of the wakeup signal;
        transmit a communication to a user equipment (UE) during a paging occasion after transmission of the wakeup signal;
        wherein the starting subframe is based at least in part on:
            a starting subframe of the paging occasion,
            a maximum duration of the wakeup signal, and
            a gap between the paging occasion and an end of the maximum duration of the wakeup signal.

31. The base station of claim 30, wherein the plurality of resources corresponds to a set of subframes associated with a same antenna port.

32. The base station of claim 30, wherein the plurality of resources corresponds to a first set of subframes associated with a first antenna port and a second set of subframes associated with a second antenna port.

33. The base station of claim 30, wherein the wakeup signal and communication are transmitted on a same narrowband.

34. The base station of claim 30, wherein the plurality of resources does not include subframe that carry a physical broadcast channel, a primary synchronization signal, or a secondary synchronization signal.

* * * * *